United States Patent
Higashiyama et al.

(10) Patent No.: US 11,902,045 B2
(45) Date of Patent: Feb. 13, 2024

(54) DEVICE NETWORK SYSTEM

(71) Applicant: DAIKIN INDUSTRIES, LTD., Osaka (JP)

(72) Inventors: Shin Higashiyama, Osaka (JP); Chanwenn Tok, Osaka (JP); Yuki Murakami, Osaka (JP); Tsutomu Iura, Osaka (JP); Kosuke Hotta, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/230,589

(22) Filed: Aug. 4, 2023

(65) Prior Publication Data

US 2023/0412417 A1 Dec. 21, 2023

Related U.S. Application Data

(63) Continuation of application No. PCT/JP2022/005159, filed on Feb. 9, 2022.

(30) Foreign Application Priority Data

Feb. 10, 2021 (JP) ................................ 2021-020134

(51) Int. Cl.
*G06F 15/173* (2006.01)
*H04L 12/28* (2006.01)
*H04L 41/08* (2022.01)

(52) U.S. Cl.
CPC .......... *H04L 12/2809* (2013.01); *H04L 41/08* (2013.01)

(58) Field of Classification Search
CPC ............................. H04L 12/2809; H04L 41/08
See application file for complete search history.

(56) References Cited

U.S. PATENT DOCUMENTS

2019/0014464 A1* 1/2019 Kuge .................... H04W 76/11
2022/0170657 A1* 6/2022 Higashiyama .......... H04L 12/12

FOREIGN PATENT DOCUMENTS

| EP | 1827055 A1 * | 8/2007 | ......... H04Q 11/0421 |
| EP | 3334238 A1 * | 6/2018 | ............ H04W 12/04 |
| JP | 2020-167576 A | 10/2020 | |
| WO | WO-2020203575 A1 * | 10/2020 | ............ F24F 1/0007 |

OTHER PUBLICATIONS

International Search Report of corresponding PCT Application No. PCT/JP2022/005159 dated Apr. 5, 2022.
International Preliminary Report of corresponding PCT Application No. PCT/JP2022/005159 dated Aug. 24, 2023.

* cited by examiner

*Primary Examiner* — Richard G Keehn
(74) *Attorney, Agent, or Firm* — Global IP Counselors, LLP

(57) ABSTRACT

In a device network system, system recognition processing that identifies a device connected by a wired line is performed using a low-frequency signal of a frequency lower than a first frequency used in communication, and a signal of the first frequency is used to transmit predetermined instruction information. The low-frequency signal includes first information for connection to a network, and identification information of a group to which a device to which the low-frequency signal is transmitted belongs. The predetermined instruction information is transmitted to a device that has received the low-frequency signal, has registered the first information, and has connected to the network, and for which participation in the network has been approved.

16 Claims, 14 Drawing Sheets

DEVICE NETWORK SYSTEM

CROSS-REFERENCE TO RELATED APPLICATIONS

This is a continuation of International Application No. PCT/JP2022/005159 filed on Feb. 9, 2022, which claims priority to Japanese Patent Application No. 2021-020134, filed on Feb. 10, 2021. The entire disclosures of these applications are incorporated by reference herein.

BACKGROUND

Technical Field

The present disclosure relates to a device network system for performing high-frequency communication.

Background Art

System recognition processing in communication between devices is disclosed in, for example, Japanese Unexamined Patent Application Publication No. 2020-167576. In the system recognition processing, a pulse having a frequency lower than a frequency used in the communication is used, and a device connected by wired lines is identified depending on whether or not the pulse reaches the device. As a result, a device of another network not physically joined is prevented from being recognized as the same system (crosstalk).

SUMMARY

A device network system according to a first aspect is a device network system in which system recognition processing that identifies a device connected by a wired line is performed using a low-frequency signal of a frequency lower than a first frequency used in communication. A signal of the first frequency is used to transmit predetermined instruction information. The low-frequency signal includes first information for connection to a network, and identification information of a group to which a device to which the low-frequency signal is transmitted belongs. The predetermined instruction information is transmitted to a device that has received the low-frequency signal, has registered the first information, and has connected to the network, and for which participation in the network has been approved.

DETAILED DESCRIPTION OF EMBODIMENT(S)

(1) Configuration of Device Network System

Figure 1A:
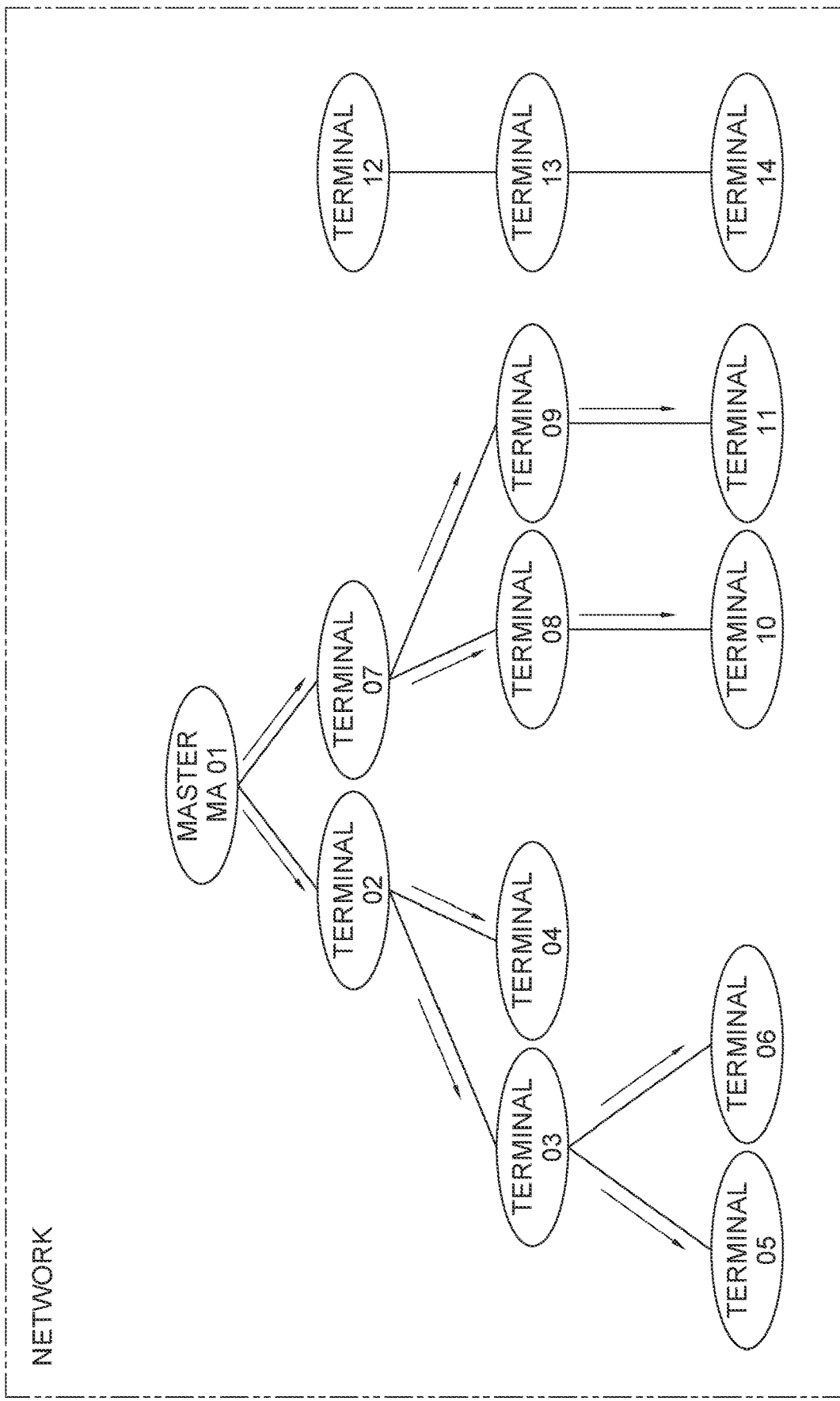
FIG. 1A is a configuration diagram showing a state in which two networks, which are not physically connected, are coupled due to occurrence of crosstalk.
Figure 1B:
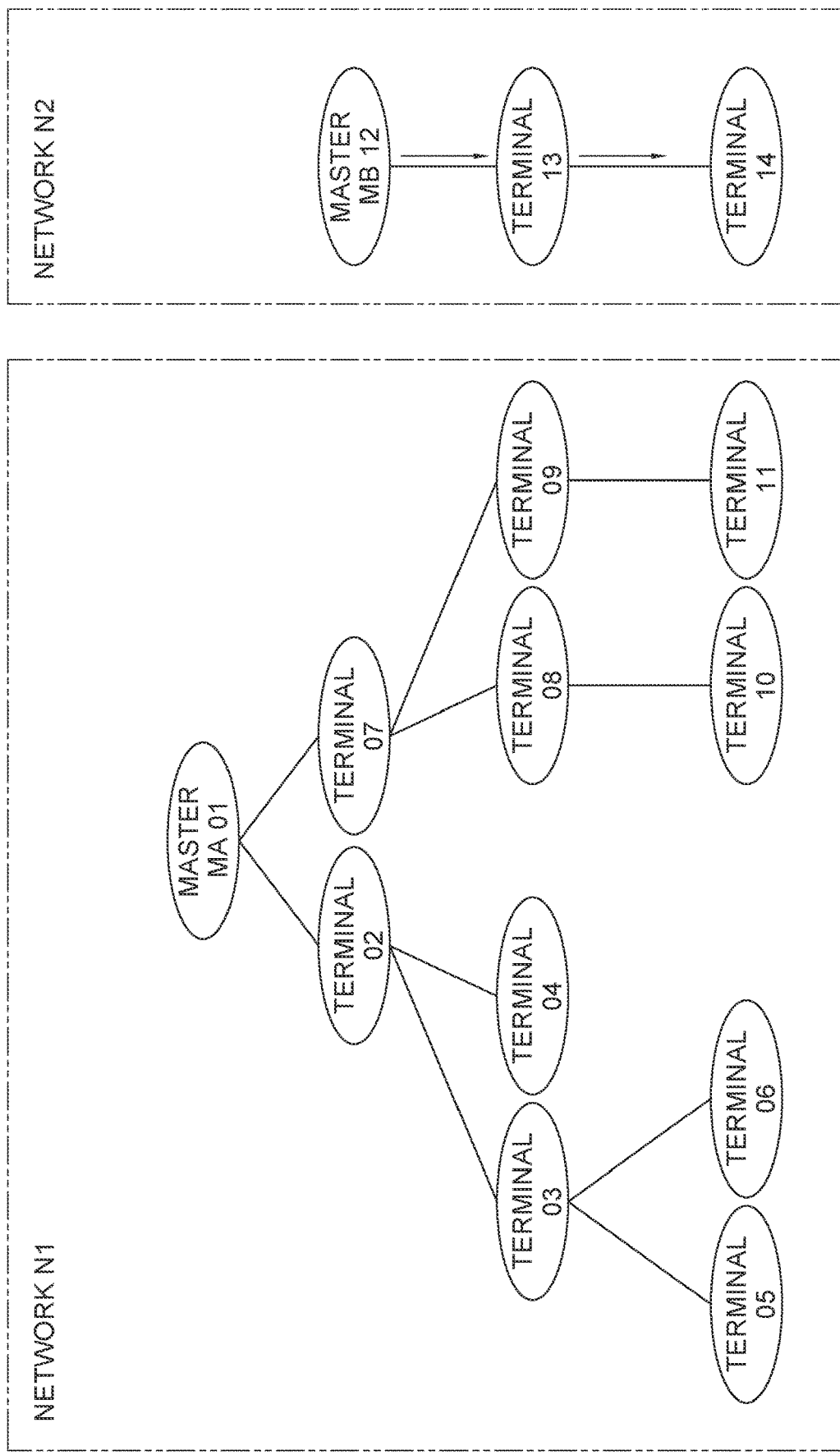
FIG. 1B is a configuration diagram showing an ideal state in which two networks are not coupled.

FIGS. 1A and 1B are configuration diagrams of a network constructed by connecting devices with a physical wired line. FIG. 1A is a configuration diagram showing a state in which two networks, which are not physically connected, are coupled due to occurrence of crosstalk. FIG. 1B is a configuration diagram showing an ideal state in which two networks N1 and N2 are not coupled.

Since in FIG. 1A, the communication scheme is high-frequency communication, crosstalk is likely to occur when communication lines that are not physically connected are arranged close to each other. When crosstalk occurs, terminals 12, 13, and 14, which are devices not physically connected, are also coupled to a network.

In such a case, a decrease in communication speed due to an increase in signal attenuation in the crosstalk portion or instability of the communication due to the construction of the network that is larger than the expected size may be caused and influence the operation of the air-conditioning devices.

In order to provide a device network system in which even if one network and another network are close to each other, the networks are not coupled to each, it is necessary to identify ranges connected using physical wired lines and construct the networks in the ranges.

As a means therefor, system recognition is performed to identify the networks by communication using a low-frequency signal that is unlikely to cause crosstalk, separately from the high-frequency communication.

In the state of FIG. 1A, a low-frequency signal that is unlikely to cause crosstalk is transmitted from a master MA to downstream terminals, and from upstream terminals to downstream terminals. The low-frequency signal does not propagate to the terminals 12, 13, and 14, which are only coupled by crosstalk and are not physically connected. Terminals that have received the low-frequency signal transmits a predetermined reply to the master MA.

The terminals 12, 13, and 14, which are only coupled by crosstalk, do not receive the low-frequency signal and disconnect from the network. Then, as shown in FIG. 1B, the terminal 12 makes a transition to a master MB, and performs system recognition for identifying the network by communication using a low-frequency signal that is unlikely to cause crosstalk, separately from high-frequency communication.

(2) System Recognition Procedure

As shown in FIGS. 1A and 1B, for the devices on the network, roles of the master and the terminals exist. On one network, one device is the master, and the other devices are terminals. The master manages the network.

Figure 2:
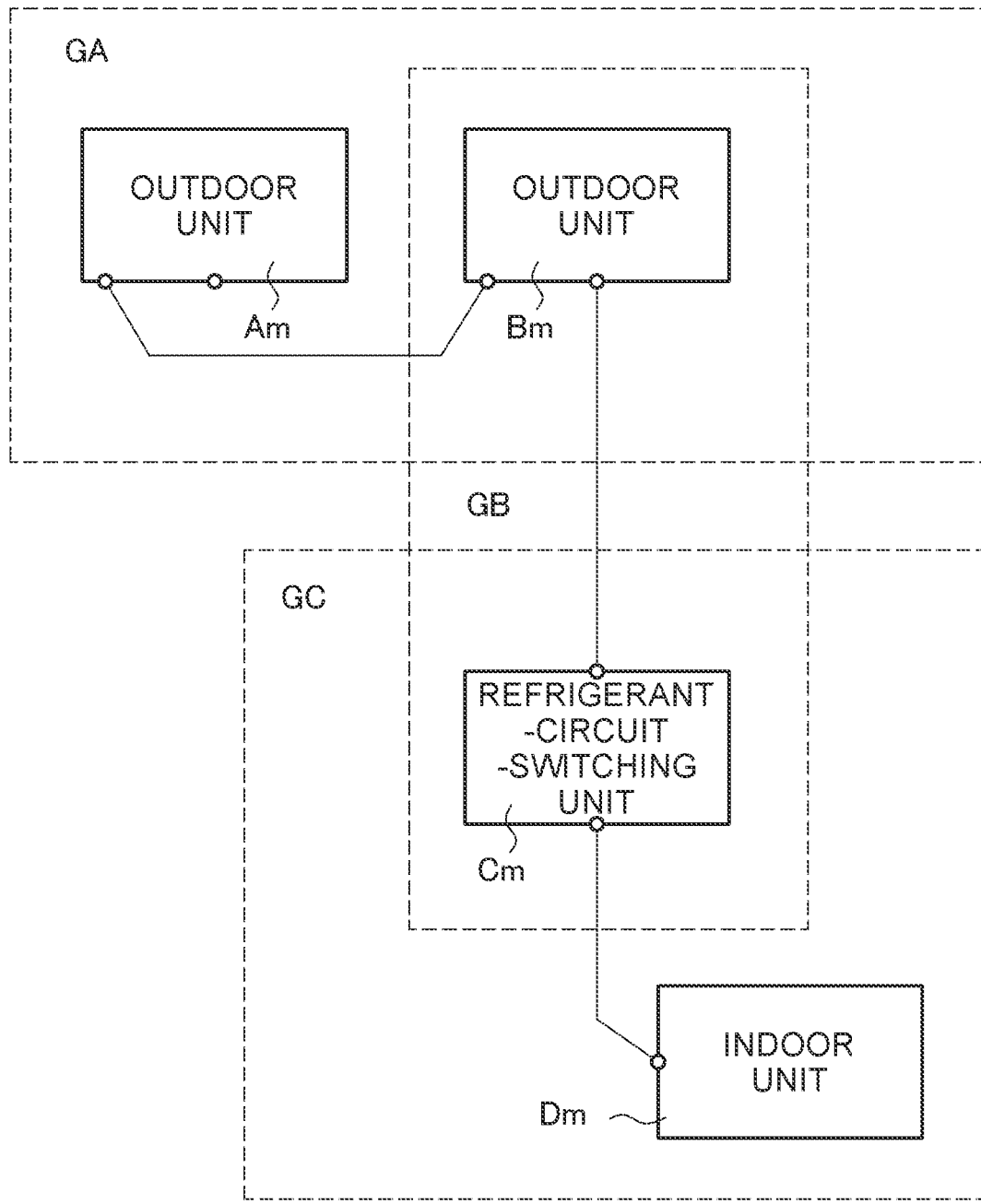
FIG. 2 is a configuration diagram showing an example of a network constructed by connecting air-conditioning devices with physical wired lines.
Figure 3:
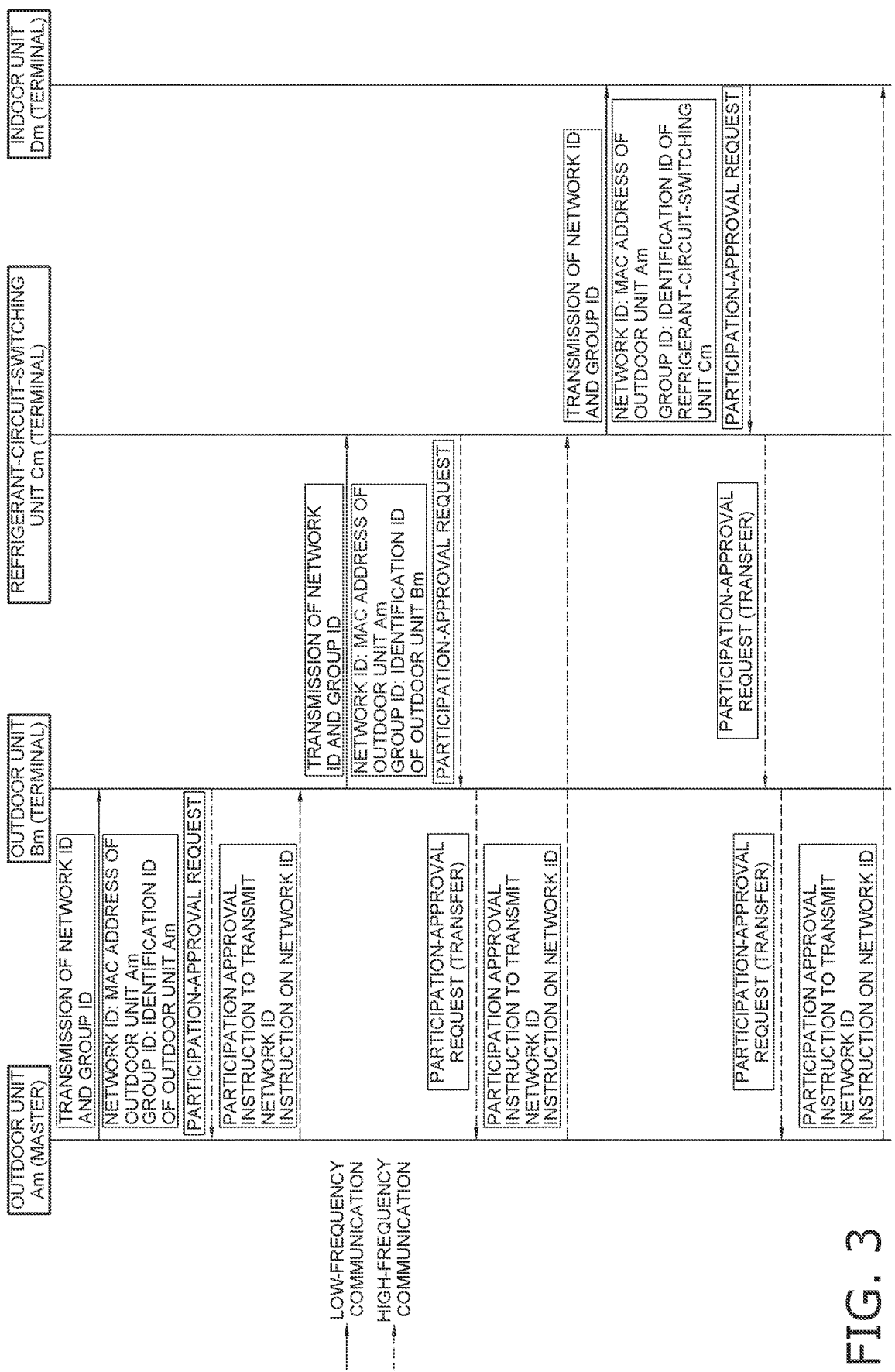
FIG. 3 is a chart showing a procedure of system recognition in the network of FIG. 2.

FIG. 2 is a configuration diagram showing an example of a network constructed by connecting air-conditioning devices with physical wired lines. FIG. 3 is a chart showing a procedure of system recognition in the network of FIG. 2.

In FIG. 2, the network is formed by connecting, in a tree shape, a group GA of an outdoor unit Am, a group GB of an outdoor unit Bm, and a group GC of a refrigerant-circuit-switching unit Cm.

The group GA of the outdoor unit Am is a higher-level group in which the outdoor unit Am and the outdoor unit Bm are connected by a physical wired line. Specifically, a downstream-side connection port of the outdoor unit Am and a downstream-side connection port of the outdoor unit Bm are joined by a communication line.

The group GB of the outdoor unit Bm is a medium-level group in which the outdoor unit Bm and the refrigerant-circuit-switching unit Cm are connected by a physical wired line. Specifically, a downstream-side connection port of the outdoor unit Bm and an upstream-side connection port of the refrigerant-circuit-switching unit Cm are joined by a communication line.

The group GC of the refrigerant-circuit-switching unit Cm is a lower-level group in which the refrigerant-circuit-switching unit Cm and the indoor unit Dm are connected by a physical wired line. Specifically, a downstream-side connection port of the refrigerant-circuit-switching unit Cm and an upstream-side connection port of the indoor unit Dm are joined by a communication line.

In the network, the outdoor unit Am is a master, and the outdoor unit Bm, the refrigerant-circuit-switching unit Cm, and the indoor unit Dm are terminals.

(2-1) Operations of Outdoor Unit Am

The outdoor unit Am transmits, by a low-frequency signal, a network ID and a group ID to the outdoor unit Bm connected to the downstream-side port.

The network ID is the media access control (MAC) address of the outdoor unit Am. The group ID is the identification ID of the outdoor unit Am. Since the network ID and the group ID are transmitted, by the low-frequency signal, to only the device connected by the physical wired line, the network ID and the group ID do not propagate to devices coupled by crosstalk.

The outdoor unit Bm that has received the network ID and the group ID registers the network ID, and requests, from the outdoor unit Am, an "approval for participation in the network" by high-frequency communication.

The outdoor unit Am transmits, as a reply, by high-frequency communication, to the outdoor unit Bm, an approval for participation in the network, an instruction to "transmit a network ID to downstream devices", and an instruction on the "network ID to be transmitted by a low-frequency signal".

The approval for participation in the network, the instruction to "transmit a network ID to downstream devices", and the instruction on the "network ID to be transmitted by a low-frequency signal" are aggregated into one message, and the one message is transmitted. The aggregation of the messages can reduce the total number of messages on the communication line, and can reduce the traffic. Specifically, header portions of packets are reduced to a header portion of a packet of one message, and responses to messages are reduced to one message. Further, although it is necessary to configure the control unit considering a possibility that the order of the messages changes due to network congestion or the like, the aggregation of the messages into one message can simplify the structure of the control unit.

Further, the outdoor unit Bm stores the received group ID (the identification ID of the outdoor unit Am) as a group to which the upstream-side port of the outdoor unit Bm is connected.

(2-2) Operations of Outdoor Unit Bm

The outdoor unit Bm transmits, by a low-frequency signal, a network ID and a group ID to the refrigerant-circuit-switching unit Cm downstream of the outdoor unit Bm. The network ID is the same as the network ID received from the outdoor unit Am. The group ID is the identification ID of the outdoor unit Bm.

The refrigerant-circuit-switching unit Cm that has received the network ID and the group ID registers the network ID, and requests an "approval for participation in the network" by high-frequency communication. The request is transmitted to the outdoor unit Bm, and the outdoor unit Bm transfers the request to the outdoor unit Am.

The outdoor unit Am transmits, as a reply, by high-frequency communication, to the refrigerant-circuit-switching unit Cm, an approval for participation in the network, an instruction to "transmit a network ID to downstream devices", and an instruction on the "network ID to be transmitted by a low-frequency signal".

Further, the refrigerant-circuit-switching unit Cm stores the received group ID (the identification ID of the outdoor unit Bm) as a group to which the upstream-side port of the refrigerant-circuit-switching unit Cm is connected.

(2-3) Operations of Refrigerant-Circuit-Switching Unit Cm

The refrigerant-circuit-switching unit Cm transmits, by a low-frequency signal, a network ID and a group ID to the indoor unit Dm downstream of the refrigerant-circuit-switching unit Cm. The network ID is the same as the network ID received from the outdoor unit Am. The group ID is the identification ID of the refrigerant-circuit-switching unit Cm.

The indoor unit Dm that has received the network ID and the group ID registers the network ID, and requests an "approval for participation in the network" by high-frequency communication. The request is transmitted to the refrigerant-circuit-switching unit Cm, the refrigerant-circuit-switching unit Cm transfers the request to the outdoor unit Bm, and the outdoor unit Bm transfers the request to the outdoor unit Am.

The outdoor unit Am transmits, as a reply, by high-frequency communication, to the indoor unit Dm, an approval for participation in the network, an instruction to "transmit a network ID to downstream devices", and an instruction on the "network ID to be transmitted by a low-frequency signal".

Further, the indoor unit Dm stores the received group ID (the identification ID of the refrigerant-circuit-switching unit Cm) as a group to which the upstream-side port of the indoor unit Dm is connected.

As described above, a downstream terminal performs operations similar to the operations of an upstream terminal to propagate the network ID and the group ID to the most downstream terminal. The operations are called system recognition.

Figure 4A:
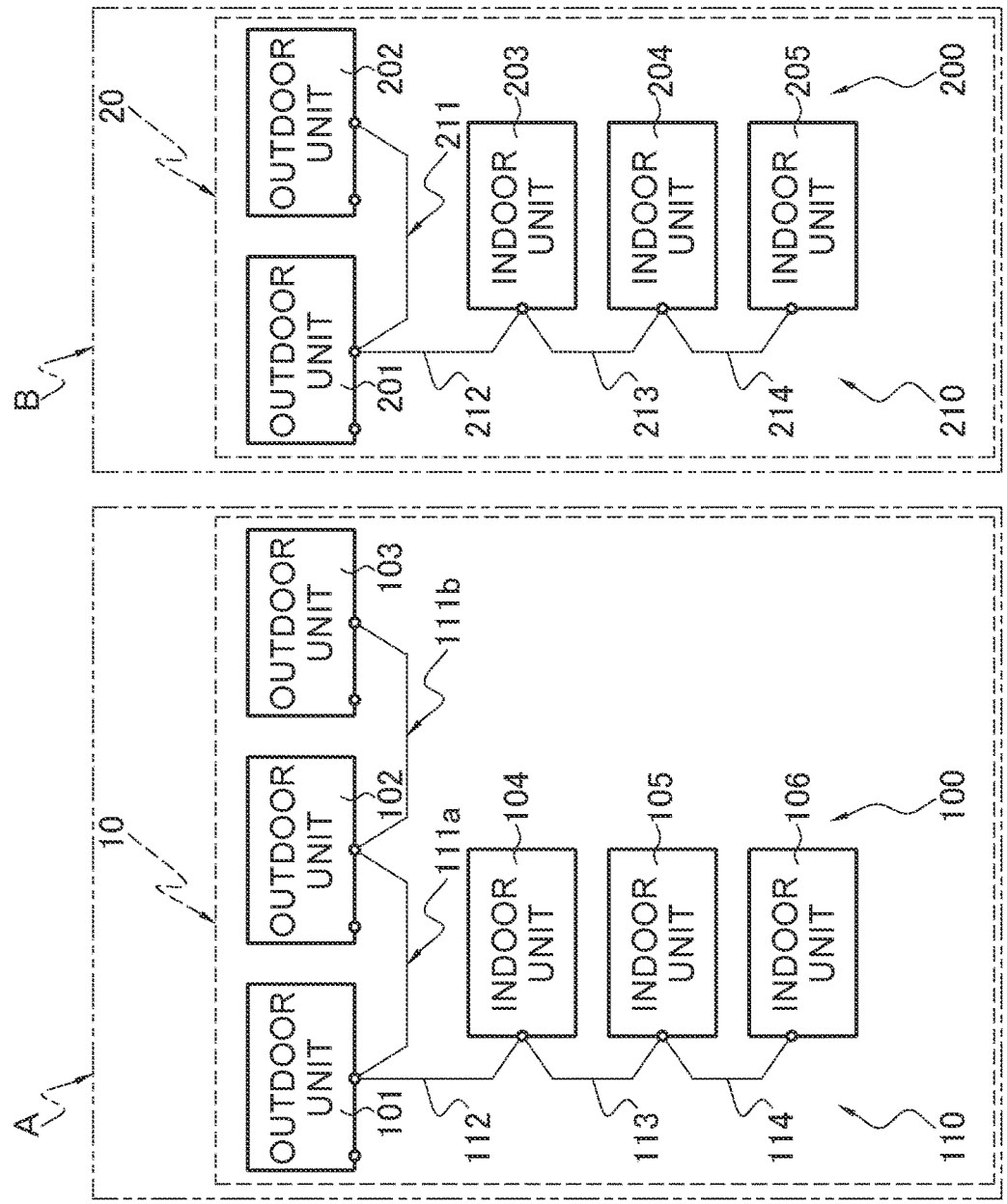
FIG. 4A is a configuration diagram of an air-conditioning system including a plurality of refrigerant systems.

(3) Application to Air-Conditioning System Including a Plurality of Refrigerant Systems FIG. 4A is a configuration diagram of an air-conditioning system including a plurality of refrigerant systems. In FIG. 4A, the air-conditioning system includes outdoor units and indoor units, and a unit of a system physically connected by refrigerant pipes is referred to as a refrigerant system.

In a refrigerant system A, outdoor units 101, 102, and 103 and indoor units 104, 105, and 106 as devices belonging to a first device group 100 are connected by wired lines 111a, 111b, 112, 113, and 114 belonging to a first wired-line group 110. The first device group 100 and the first wired-line group 110 form a first network 10.

In a refrigerant system B, outdoor units 201 and 202 and indoor units 203, 204, and 205 as devices belonging to a second device group 200 are connected by wired lines 211, 212, 213, and 214 belonging to a second wired-line group 210. The second device group 200 and the second wired-line group 210 form a second network 20.

Communication between the devices is performed by high frequencies equal to or higher than 100 kHz. All the outdoor units include two downstream-side ports for connecting communication lines to devices downstream of the outdoor unit. A group ID for identifying the outdoor unit can be transmitted from each port. The system recognition identifies which of the systems A and B to which each outdoor unit and each indoor unit belong.

The present embodiment will be described on the assumption that master-terminal-scheme communication is used and the outdoor unit 101 of the refrigerant system A has been automatically determined as the master.

(3-1) System Recognition in Refrigerant System A

The outdoor unit 101 transmits a low-frequency signal including a network ID and a group ID to the outdoor units 102 and 103 and the indoor units 104, 105, and 106 connected to the downstream-side ports. As the low-frequency signal, a low-frequency pulse of 10 kHz or lower is used.

The network ID is the MAC address of the outdoor unit 101. The group ID is the identification ID of the outdoor unit 101. Since the network ID and the group ID are transmitted, by the low-frequency signal, to only the devices connected by the physical wired lines, the network ID and the group ID do not propagate to devices coupled by crosstalk.

The outdoor units 102 and 103 and the indoor units 104, 105, and 106 that have received the network ID and the group ID register the network ID, and request, from the outdoor unit 101, an "approval for participation in the network" by high-frequency communication.

The outdoor unit 101 transmits, as a reply, by high-frequency communication, to the outdoor units 102 and 103 and the indoor units 104, 105, and 106, an approval for participation in the network, an instruction to "transmit a network ID to downstream devices", and an instruction on the "network ID to be transmitted by a low-frequency signal".

Further, the outdoor units 102 and 103 and the indoor units 104, 105, and 106 store the received group ID (the identification ID of the outdoor unit 101) as a group to which the upstream-side ports of the outdoor units 102 and 103 and the indoor units 104, 105, and 106 are connected.

(3-2) System Recognition in Refrigerant System B

Even if the second network 20 of the refrigerant system B is coupled to the first network 10 of the refrigerant system A by crosstalk, the low-frequency signal does not reach the devices of the refrigerant system B during the system recognition processing in the first network 10, the devices of the refrigerant system B determine that the network in which the devices participate is improperly connected, and the devices of the second network 20 disconnect from the first network 10. As a result, in the refrigerant system B, the outdoor unit 201 starts up as the master.

The outdoor unit 201 transmits a low-frequency signal including a network ID and a group ID to the outdoor unit 202 and the indoor units 203, 204, and 205 connected to the downstream-side ports. The network ID is the MAC address of the outdoor unit 201. The group ID is the identification ID of the outdoor unit 201.

The outdoor unit 202 and the indoor units 203, 204, and 205 that have received the network ID and the group ID register the network ID, and request an "approval for participation in the network" by high-frequency communication.

The outdoor unit 201 transmits, as a reply, by high-frequency communication, to the outdoor unit 202 and the indoor units 203, 204, and 205, an approval for participation in the network, an instruction to "transmit a network ID to downstream devices", and an instruction on the "network ID to be transmitted by a low-frequency signal".

Further, the outdoor unit 202 and the indoor units 203, 204, and 205 store the received group ID (the identification ID of the outdoor unit 201) as a group to which the upstream-side ports of the outdoor unit 202 and the indoor units 203, 204, and 205 are connected.

As described above, since the system recognition processing is performed using a low-frequency signal including a network ID and a group ID, it is possible to prevent a device of another network that is not physically joined from being recognized as the same system (crosstalk). Further, even in a case where there is a plurality of networks that is targets of the system recognition, the system recognition processing can be simultaneously performed, and the time taken by the system recognition processing is shortened. As a result, it is possible to both prevent crosstalk and shorten the system recognition processing time.

Figure 4B:
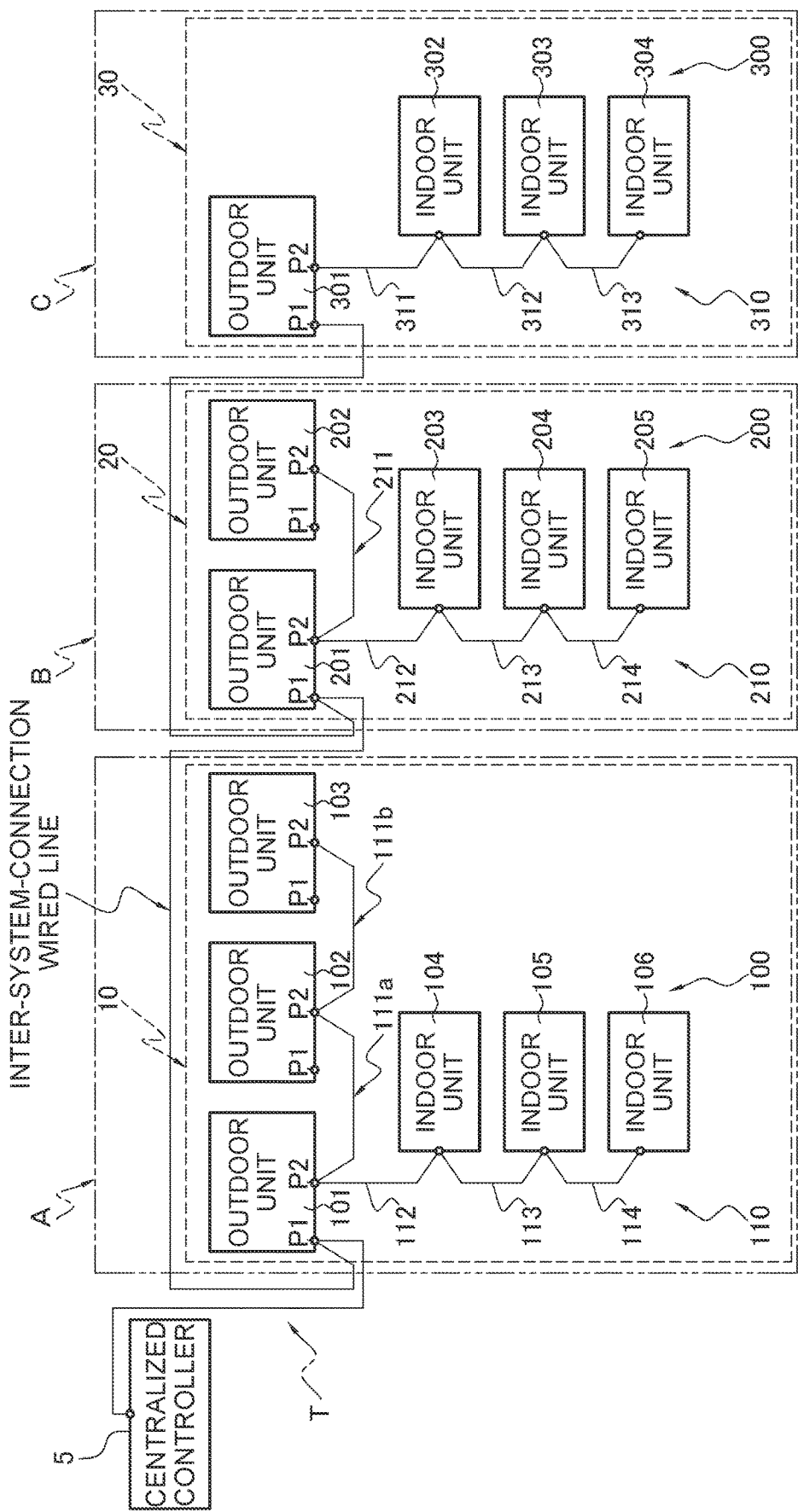
FIG. 4B is a configuration diagram of an air-conditioning system including a plurality of refrigerant systems controlled by a centralized controller.

(4) Application to Air-Conditioning System Including a Plurality of Refrigerant Systems Controlled by Centralized Controller FIG. 4B is a configuration diagram of an air-conditioning system including a plurality of refrigerant systems controlled by a centralized controller. In FIG. 4B, the air-conditioning system includes outdoor units, indoor units, and the centralized controller, and a unit of a system physically connected by refrigerant pipes is referred to as a refrigerant system.

In a refrigerant system A, outdoor units 101, 102, and 103 and indoor units 104, 105, and 106 as devices belonging to a first device group 100 are connected by wired lines 111a, 111b, 112, 113, and 114 belonging to a first wired-line group 110.

In a refrigerant system B, outdoor units 201 and 202 and indoor units 203, 204, and 205 as devices belonging to a second device group 200 are connected by wired lines 211, 212, 213, and 214 belonging to a second wired-line group 210.

In a refrigerant system C, an outdoor unit 301 and indoor units 302, 303, and 304 as devices belonging to a third device group 300 are connected by wired lines 311, 312, and 313 belonging to a third wired-line group 310.

As shown in FIG. 4B, in the air-conditioning system, in order to control the plurality of refrigerant systems A, B, and C, the outdoor unit 101 of the refrigerant system A, the outdoor unit 201 of the refrigerant system B, and the outdoor unit 301 of the refrigerant system C are connected by inter-system-connection wired lines, and a centralized controller 5 is connected to the inter-system-connection wired lines. Communication between the devices is performed by high frequencies equal to or higher than 100 kHz.

All the outdoor units include two downstream-side ports for connecting communication lines to devices downstream of the outdoor unit. For convenience of the description, in FIG. 4B seen from the front, a port on the left side of the lower side of a quadrilateral indicating each outdoor unit is referred to as a first port P1, and a port on the right side of the lower side of the quadrilateral is referred to as a second port P2.

A group ID for identifying the outdoor unit can be transmitted from each port. However, even for the same outdoor unit, a group ID transmitted from the first port P1 and a group ID transmitted from the second port P2 are different.

For convenience of the description, a group to which the outdoor unit 101 of the refrigerant system A, the outdoor unit 201 of the refrigerant system B, the outdoor unit 301 of the refrigerant system C, and the centralized controller 5 belong is referred to as a "system T".

In the present embodiment, the system recognition processing will be described on the assumption that master-terminal-scheme communication is used and the outdoor unit 101 of the refrigerant system A has been automatically determined as the master.

(4-1) System Recognition in System T

The outdoor unit 101 transmits a low-frequency signal including a network ID and a group ID to the outdoor unit 201 of the refrigerant system B, the outdoor unit 301 of the refrigerant system C, and the centralized controller 5 on the downstream side and connected to the first port P1. As the low-frequency signal, a low-frequency pulse of 10 kHz or lower is used.

The network ID is the MAC address of the outdoor unit 101. The group ID is the identification ID of the first port P1 side of the outdoor unit 101. Since the network ID and the group ID are transmitted, by the low-frequency signal, to only the devices connected by the physical wired lines, the network ID and the group ID do not propagate to devices coupled by crosstalk.

Further, a high-frequency-passing filter, for example, a capacitor, prevents the low-frequency signal from propagating to the outdoor units 102 and 103 of the refrigerant system A and the outdoor unit 202 of the refrigerant system B.

The outdoor unit 201 of the refrigerant system B, the outdoor unit 301 of the refrigerant system C, and the centralized controller 5 that have received the network ID and the group ID register the network ID, and request, from the outdoor unit 101, an "approval for participation in the network" by high-frequency communication.

The outdoor unit 101 transmits, as a reply, by high-frequency communication, an approval for participation in the network, to the outdoor unit 201 of the refrigerant system B, the outdoor unit 301 of the refrigerant system C, and the centralized controller 5.

Further, the outdoor unit 201 of the refrigerant system B, the outdoor unit 301 of the refrigerant system C, and the centralized controller 5 store the received group ID (the identification ID of the first port P1 side of the outdoor unit 101) as a group to which the upstream-side ports of the outdoor unit 201 of the refrigerant system B, the outdoor unit 301 of the refrigerant system C, and the centralized controller 5 are connected.

Next, the system recognition processing of each refrigerant system will be described in order from the refrigerant system A.

(4-2) System Recognition in Refrigerant System A

The outdoor unit 101 transmits a low-frequency signal including a network ID and a group ID to the outdoor units 102 and 103 and the indoor units 104, 105, and 106 on the downstream side and connected to the second port P2. As the low-frequency signal, a low-frequency pulse of 10 kHz or lower is used.

The network ID is the MAC address of the outdoor unit 101. The group ID is the identification ID of the second port P2 side of the outdoor unit 101. Since the network ID and the group ID are transmitted, by the low-frequency signal, to only the devices connected by the physical wired lines, the network ID and the group ID do not propagate to devices coupled by crosstalk.

The outdoor units 102 and 103 and the indoor units 104, 105, and 106 that have received the network ID and the group ID register the network ID, and request, from the outdoor unit 101, an "approval for participation in the network" by high-frequency communication.

The outdoor unit 101 transmits, as a reply, by high-frequency communication, to the outdoor units 102 and 103 and the indoor units 104, 105, and 106, an approval for participation in the network, an instruction to "transmit a network ID to downstream devices", and an instruction on the "network ID to be transmitted by a low-frequency signal".

Further, the outdoor units 102 and 103 and the indoor units 104, 105, and 106 store the received group ID (the identification ID of the second port P2 side of the outdoor unit 101) as a group to which the upstream-side ports of the outdoor units 102 and 103 and the indoor units 104, 105, and 106 are connected.

(4-3) System Recognition in Refrigerant System B

The outdoor unit 201 of the refrigerant system B transmits a low-frequency signal including a network ID and a group ID to the outdoor unit 202 and the indoor units 203, 204, and 205 on the downstream side and connected to the second port P2. The network ID is the same as the network ID received from the outdoor unit 101. The group ID is the identification ID of the second port P2 side of the outdoor unit 201.

The outdoor unit 202 and the indoor units 203, 204, and 205 that have received the network ID and the group ID register the network ID, and request an "approval for participation in the network" by high-frequency communication. The requests are transmitted to the outdoor unit 201, and the outdoor unit 201 transfers the requests to the outdoor unit 101.

The outdoor unit 101 transmits, as a reply, by high-frequency communication, to the outdoor unit 202 and the indoor units 203, 204, and 205, an approval for participation in the network, an instruction to "transmit a network ID to downstream devices", and an instruction on the "network ID to be transmitted by a low-frequency signal".

Further, the outdoor unit 202 and the indoor units 203, 204, and 205 store the received group ID (the identification ID of the second port P2 side of the outdoor unit 201) as a group to which the upstream-side ports of the outdoor unit 202 and the indoor units 203, 204, and 205 are connected.

(4-4) System Recognition in Refrigerant System C

The outdoor unit 301 of the refrigerant system C transmits a low-frequency signal including a network ID and a group ID to the indoor units 302, 303, and 304 on the downstream side and connected to the second port P2. The network ID is the same as the network ID received from the outdoor unit 101. The group ID is the identification ID of the second port P2 side of the outdoor unit 301.

The indoor units 302, 303, and 304 that have received the network ID and the group ID register the network ID, and request an "approval for participation in the network" by high-frequency communication. The requests are transmitted to the outdoor unit 301, and the outdoor unit 301 transfers the requests to the outdoor unit 101.

The outdoor unit 101 transmits, as a reply, by high-frequency communication, to the indoor units 302, 303, and 304, an approval for participation in the network, an instruction to "transmit a network ID to downstream devices", and an instruction on the "network ID to be transmitted by a low-frequency signal".

Further, the indoor units 302, 303, and 304 store the received group ID (the identification ID of the second port P2 side of the outdoor unit 301) as a group to which the upstream-side ports of the indoor units 302, 303, and 304 are connected.

(5) Application to Simultaneous-Cooling-and-Heating-Operation Air-Conditioning System Some air-conditioning systems can simultaneously perform a cooling operation and a heating operation in the same refrigerant system, and are referred to as simultaneous-cooling-and-heating-operation air-conditioning systems.

In a simultaneous-cooling-and-heating-operation air-conditioning system, a refrigerant-circuit-switching unit for switching a refrigerant circuit between an outdoor unit and an indoor unit is installed. Accordingly, the refrigerant-circuit-switching unit needs to recognize the indoor unit connected downstream of the refrigerant-circuit-switching unit.

(5-1) Refrigerant-Circuit-Switching Unit

Figure 5A:
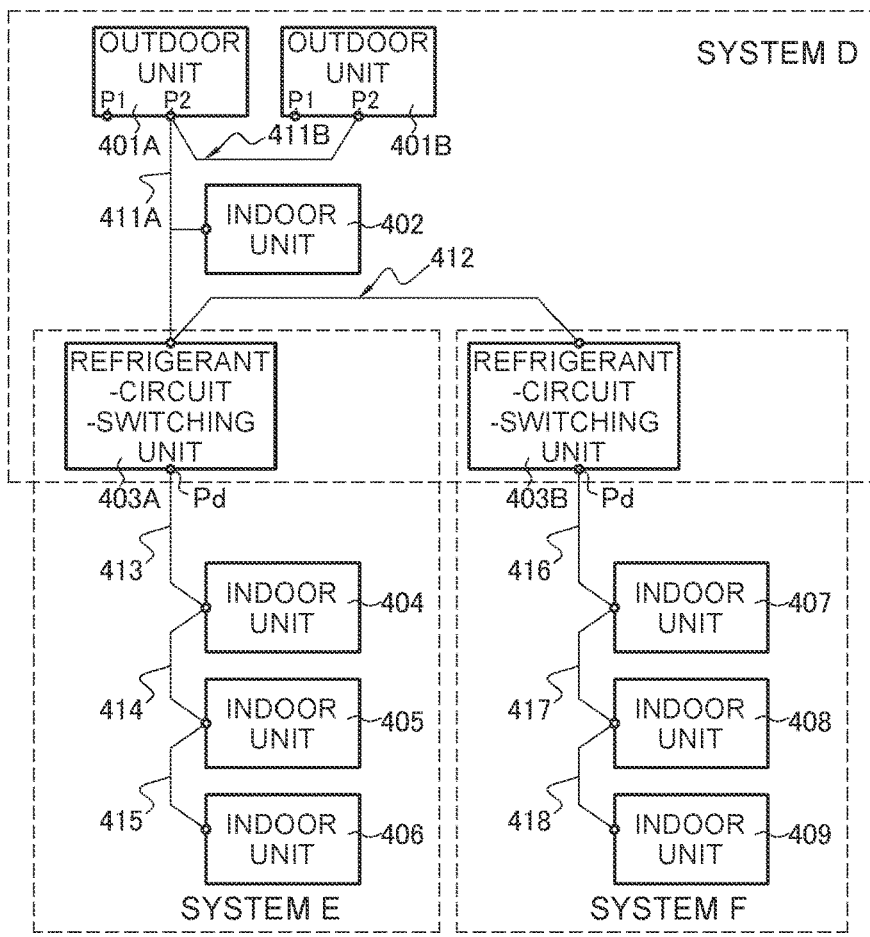
FIG. 5A is a configuration diagram of a simultaneous-cooling-and-heating-operation air-conditioning system.

FIG. 5A is a configuration diagram of a simultaneous-cooling-and-heating-operation air-conditioning system including refrigerant-circuit-switching units. In FIG. 5A, the simultaneous-cooling-and-heating-operation air-conditioning system includes outdoor units, indoor units, and refrigerant-circuit-switching units for switching a refrigerant circuit between the outdoor units and the indoor units.

Although only one refrigerant system is shown in FIG. 5A, it is necessary to identify the indoor units connected downstream of the refrigerant-circuit-switching units in terms of refrigerant control, and thus it is necessary to divide the refrigerant system into three small systems D, E, and F to perform system recognition.

In the system D, outdoor units 401A and 401B, an indoor unit 402, and refrigerant-circuit-switching units 403A and 403B as devices are connected by wired lines 411A, 411B, and 412.

In the system E, the refrigerant-circuit-switching unit 403A and indoor units 404, 405, and 406 as devices are connected by wired lines 413, 414, and 415.

In the system F, the refrigerant-circuit-switching unit 403B and indoor units 407, 408, and 409 as devices are connected by wired lines 416, 417, and 418.

The refrigerant-circuit-switching unit 403A connects the system D with the system E. The refrigerant-circuit-switching unit 403B connects the system D with the system F.

Therefore, the indoor unit 402, the refrigerant-circuit-switching unit 403A, and the refrigerant-circuit-switching unit 403B exist downstream of the outdoor unit 401A.

Further, the indoor units 404, 405, and 406 exist downstream of the refrigerant-circuit-switching unit 403A. The indoor units 407, 408, and 409 exist downstream of the refrigerant-circuit-switching unit 403B.

Here, a description will be given on the assumption that master-terminal-scheme communication is used and the outdoor unit 401A of the system D has been automatically determined as the master.

(5-1-1) System D

The outdoor unit 401A transmits a low-frequency signal including a network ID and a group ID to the outdoor unit 401B, the indoor unit 402, and the refrigerant-circuit-switching units 403A and 403B on the downstream side and connected to a second port P2. As the low-frequency signal, a low-frequency pulse of 10 kHz or lower is used.

At this time, the low-frequency signal from the outdoor unit 401A is propagated only to the outdoor unit 401B, the indoor unit 402, and the refrigerant-circuit-switching units 403A and 403B of the system D, which is the same system, and the low-frequency signal does not propagate to the indoor units 404, 405, and 406 of the system E and the indoor units 407, 408, and 409 of the system F, which are different systems.

The network ID is the MAC address of the outdoor unit 401A. The group ID is the identification ID of the second port P2 side of the outdoor unit 401A.

The outdoor unit 401B, the indoor unit 402, and the refrigerant-circuit-switching units 403A and 403B that have received the network ID and the group ID register the network ID, and request, from the outdoor unit 401A, an "approval for participation in the network" by high-frequency communication.

The outdoor unit 401A transmits, as a reply, by high-frequency communication, to the outdoor unit 401B, the indoor units 402, and the refrigerant-circuit-switching units 403A and 403B, an approval for participation in the network, an instruction to "transmit a network ID to downstream devices", and an instruction on the "network ID to be transmitted by a low-frequency signal".

Further, the outdoor unit 401B, the indoor unit 402, and the refrigerant-circuit-switching units 403A and 403B store the received group ID (the identification ID of the second port P2 side of the outdoor unit 401A) as a group to which the upstream-side ports of the outdoor unit 401B, the indoor unit 402, and the refrigerant-circuit-switching units 403A and 403B are connected.

(5-1-2) System E

The refrigerant-circuit-switching unit 403A transmits a low-frequency signal including a network ID and a group ID to the indoor units 404, 405, and 406 connected to a downstream-side port Pd.

At this time, the low-frequency signal is propagated only to the indoor units 404, 405, and 406 of the same system, and the low-frequency signal does not propagate to the outdoor unit 401A, the outdoor unit 401B, and the indoor unit 402 of the system D, and the refrigerant-circuit-switching unit 403B and the indoor units 407, 408, and 409 of the system F.

The network ID is the same as the network ID received from the outdoor unit 401A. The group ID is the identification ID of the refrigerant-circuit-switching unit 403A.

The indoor units 404, 405, and 406 that have received the network ID and the group ID register the network ID, and request an "approval for participation in the network" by high-frequency communication. The requests are transmitted to the refrigerant-circuit-switching unit 403A, and the refrigerant-circuit-switching unit 403A transfers the requests to the outdoor unit 401A.

The outdoor unit 401A transmits, as a reply, by high-frequency communication, to the indoor units 404, 405, and 406, an approval for participation in the network, an instruction to "transmit a network ID to downstream devices", and an instruction on the "network ID to be transmitted by a low-frequency signal".

Further, the indoor units 404, 405, and 406 store the received group ID (the identification ID of the refrigerant-circuit-switching unit 403A) as a group to which the upstream-side ports of the indoor units 404, 405, and 406 are connected.

(5-1-3) System F

The refrigerant-circuit-switching unit 403B transmits a low-frequency signal including a network ID and a group ID to the indoor units 407, 408, and 409 connected to a downstream-side port Pd.

At this time, the low-frequency signal is propagated only to the indoor units 407, 408, and 409 of the same system, and the low-frequency signal does not propagate to the outdoor unit 401A, the outdoor unit 401B, and the indoor unit 402 of the system D, and the refrigerant-circuit-switching unit 403A and the indoor units 404, 405, and 406 of the system E.

The network ID is the same as the network ID received from the outdoor unit 401A. The group ID is the identification ID of the refrigerant-circuit-switching unit 403B.

The indoor units 407, 408, and 409 that have received the network ID and the group ID register the network ID, and request an "approval for participation in the network" by high-frequency communication. The requests are transmitted to the refrigerant-circuit-switching unit 403B, and the refrigerant-circuit-switching unit 403B transfers the requests to the outdoor unit 401A.

The outdoor unit 401A transmits, as a reply, by high-frequency communication, to the indoor units 407, 408, and 409, an approval for participation in the network, an instruction to "transmit a network ID to downstream devices", and an instruction on the "network ID to be transmitted by a low-frequency signal".

Further, the indoor units 407, 408, and 409 store the received group ID (the identification ID of the refrigerant-circuit-switching unit 403B) as a group to which the upstream-side ports of the indoor units 407, 408, and 409 are connected.

(5-2) Integrated-Refrigerant-Circuit-Switching Unit

Some refrigerant-circuit-switching units are integrated-refrigerant-circuit-switching units in which a plurality of refrigerant-switching circuits is mounted. In the integrated-refrigerant-circuit-switching unit, it is necessary to recognize which indoor unit is connected to each of a plurality of ports.

Figure 5B:
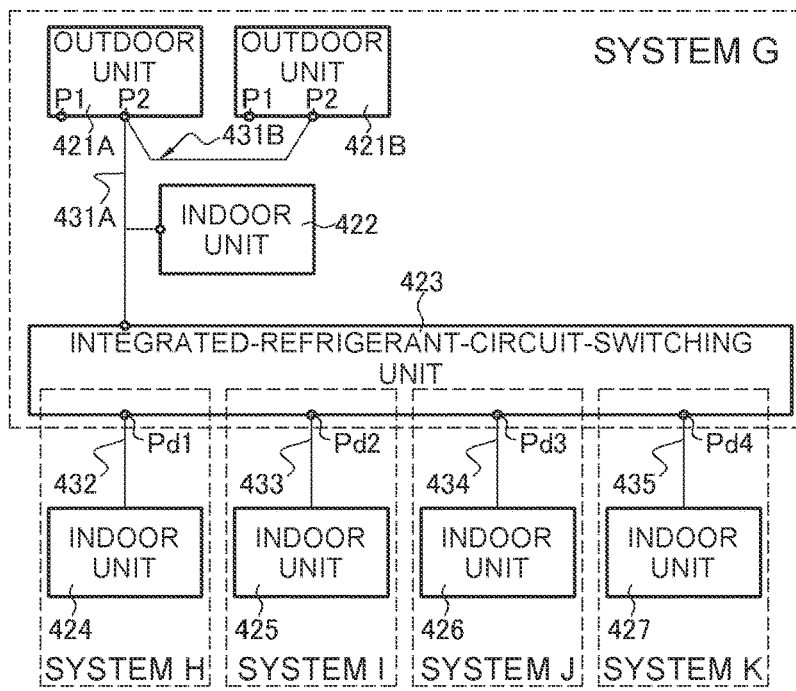
FIG. 5B is a configuration diagram of a simultaneous-cooling-and-heating-operation air-conditioning system including an integrated-refrigerant-circuit-switching unit.

FIG. 5B is a configuration diagram of a simultaneous-cooling-and-heating-operation air-conditioning system including an integrated-refrigerant-circuit-switching unit. In FIG. 5B, the simultaneous-cooling-and-heating-operation air-conditioning system includes two outdoor units, indoor units, and an integrated-refrigerant-circuit-switching unit for switching a refrigerant circuit between the outdoor units and the indoor units. Although FIG. 5B shows one refrigerant system, it is necessary to identify indoor units connected to a plurality of ports (four ports in the present embodiment) of the integrated-refrigerant-circuit-switching unit in terms of refrigerant control, and thus it is necessary to divide the refrigerant system into small systems G, H, I, J, and K to perform system recognition.

In the system G, an outdoor unit 421A, an outdoor unit 421B, an indoor unit 422, and an integrated-refrigerant-circuit-switching unit 423 as devices are connected by wired lines 431A and 431B.

In the system H, the integrated-refrigerant-circuit-switching unit 423 and an indoor unit 424 are connected by a wired line 432.

In the system I, the integrated-refrigerant-circuit-switching unit 423 and an indoor unit 425 are connected by a wired line 433.

In the system J, the integrated-refrigerant-circuit-switching unit 423 and an indoor unit 426 are connected by a wired line 434.

In the system K, the integrated-refrigerant-circuit-switching unit 423 and an indoor unit 427 are connected by a wired line 435.

Here, the description will be given on the assumption that the High Definition Power Line Communication (HD-PLC) is used as the physical layer, the network is autonomously constructed, and the outdoor unit 421A of the system G has been automatically determined as the master.

Hereinafter, the description will be made in order from the system G.

(5-2-1) System G

The outdoor unit 421A transmits a low-frequency signal including a network ID and a group ID to the outdoor unit 421B, the indoor unit 422, and the integrated-refrigerant-circuit-switching unit 423 on the downstream side and connected to a second port P2. As the low-frequency signal, a low-frequency pulse of 10 kHz or lower is used.

At this time, the low-frequency signal from the outdoor unit 421A is propagated only to the outdoor unit 421B, the indoor unit 422, and the integrated-refrigerant-circuit-switching unit 423 of the system G, which is the same system, and the low-frequency signal does not propagate to the indoor units 424, 425, 426, and 427 of the systems H to K, which are different systems.

The network ID is the MAC address of the outdoor unit 421A. The group ID is the identification ID of the second port P2 side of the outdoor unit 421A.

The outdoor unit 421B, the indoor unit 422, and the integrated-refrigerant-circuit-switching unit 423 that have received the network ID and the group ID register the network ID, and request, from the outdoor unit 421A, an "approval for participation in the network" by high-frequency communication.

The outdoor unit 421A transmits, as a reply, by high-frequency communication, to the outdoor unit 421B, the indoor unit 422, and the integrated-refrigerant-circuit-switching unit 423, an approval for participation in the network, an instruction to "transmit a network ID to downstream devices", and an instruction on the "network ID to be transmitted by a low-frequency signal".

Further, the outdoor unit 421B, the indoor unit 422, and the integrated-refrigerant-circuit-switching unit 423 store the received group ID (the identification ID of the second port P2 side of the outdoor unit 421A) as a group to which the upstream-side ports of the outdoor unit 421B, the indoor unit 422, and the integrated-refrigerant-circuit-switching unit 423 are connected.

(5-2-2) Systems H to K

The integrated-refrigerant-circuit-switching unit 423 transmits a low-frequency signal including a network ID and a group ID to the indoor units 424, 425, 426, and 427 connected to downstream-side ports Pd1, Pd2, Pd3, and Pd4, respectively. As the low-frequency signal, a low-frequency pulse of 10 kHz or lower is used.

At this time, the low-frequency signal from the integrated-refrigerant-circuit-switching unit 423 does not propagate to the outdoor unit 421A, the outdoor unit 421B, and the indoor unit 422 of the system G.

The network ID is the same as the network ID received from the outdoor unit 421A. The group ID is the identification ID of each of the downstream-side ports Pd1, Pd2, Pd3, and Pd4 of the integrated-refrigerant-circuit-switching unit 423.

The indoor units 424, 425, 426, and 427 that have received the network ID and the group ID register the network ID, and request an "approval for participation in the network" by high-frequency communication. The requests are transmitted to the integrated-refrigerant-circuit-switching unit 423, and the integrated-refrigerant-circuit-switching unit 423 transfers the requests to the outdoor unit 421A.

The outdoor unit 421A transmits, as a reply, by high-frequency communication, to the indoor units 424, 425, 426, and 427, an approval for participation in the network, an instruction to "transmit a network ID to downstream devices", and an instruction on the "network ID to be transmitted by a low-frequency signal".

Further, the indoor units 424, 425, 426, and 427 store the received group ID (the identification ID of each of the downstream-side ports Pd1, Pd2, Pd3, and Pd4 of the integrated-refrigerant-circuit-switching unit 423) as a group to which the upstream-side ports of the indoor units 424, 425, 426, and 427 are connected.

(6) Low-Frequency-Signal-Superimposing Scheme

In the present application, high-frequency communication is employed for the communication, and a low-frequency signal sufficiently separated in frequency from a frequency used for the communication is used as a signal for the system recognition. This is referred to as a low-frequency-signal-superimposing scheme. The low-frequency-signal-superimposing scheme is a method in which a low-frequency signal is propagated only to devices in the same refrigerant system, and devices that have received this low-frequency signal are recognized as devices in the same system.

Figure 6A:
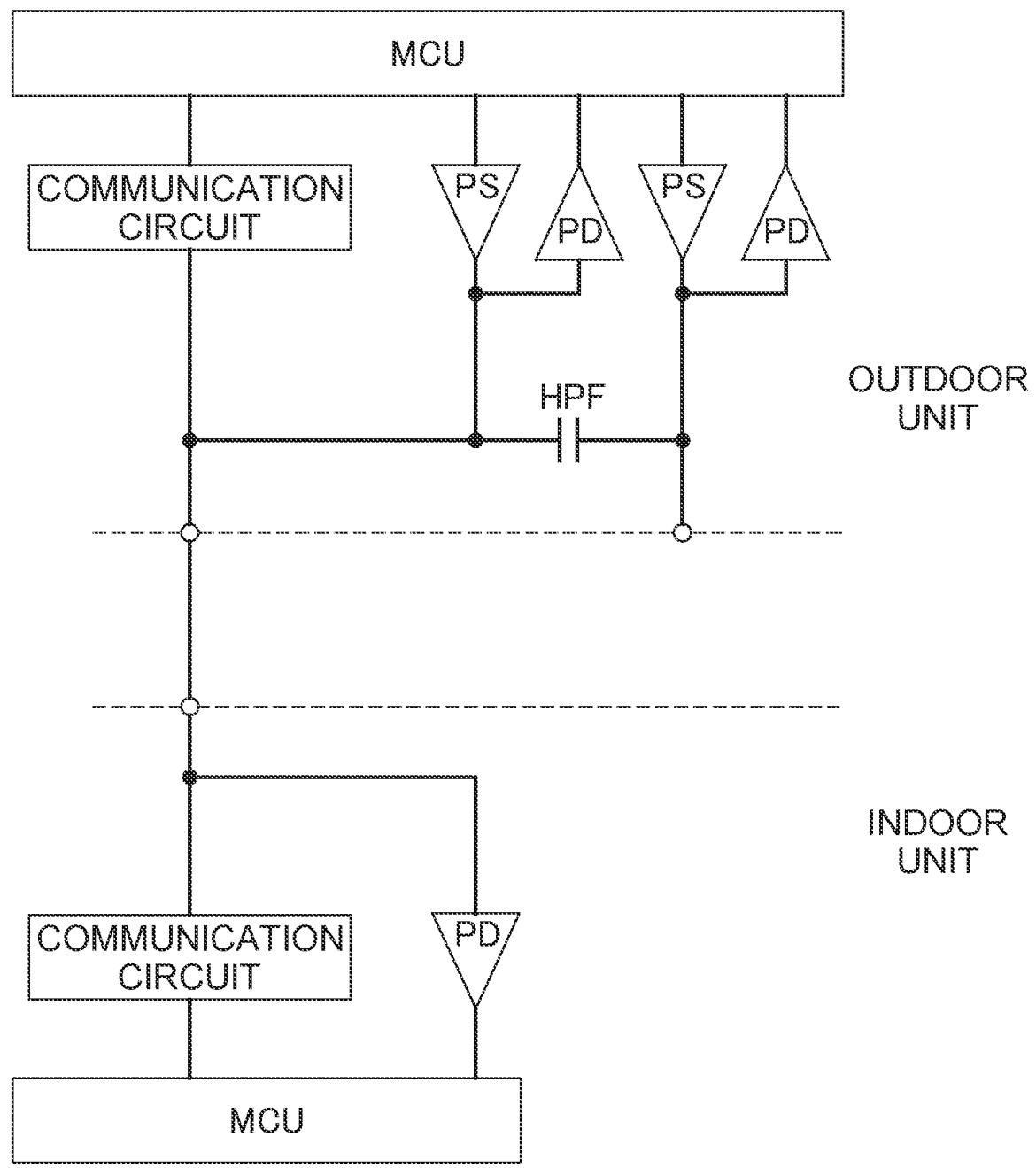
FIG. 6A is a circuit block diagram of a low-frequency-signal superimposing scheme.

FIG. 6A is a circuit block diagram of a low-frequency-signal-superimposing scheme. One device (for example, an outdoor unit) is provided with a control microcomputer (hereinafter, referred to as an MCU), two downstream-side ports, and a communication circuit. Each of the two downstream-side ports includes a low-frequency-signal-transmitting circuit PS and a low-frequency-signal-receiving circuit PD. Further, a high-frequency-passing filter HPF, which blocks the propagation of a low-frequency signal and passes a high-frequency signal, is provided between the two downstream-side ports. The other device (for example, an indoor unit) is provided with an MCU, a communication circuit, and a low-frequency-signal-receiving circuit PD.

The timing of the low-frequency signal transmission by the outdoor unit is harmonized with the timing of the low-frequency signal reception by the indoor unit, and the outdoor unit is notified that the indoor unit can receive the low-frequency signal, so that it is possible to recognize the fact of being in the same refrigerant system.

Figure 6B:
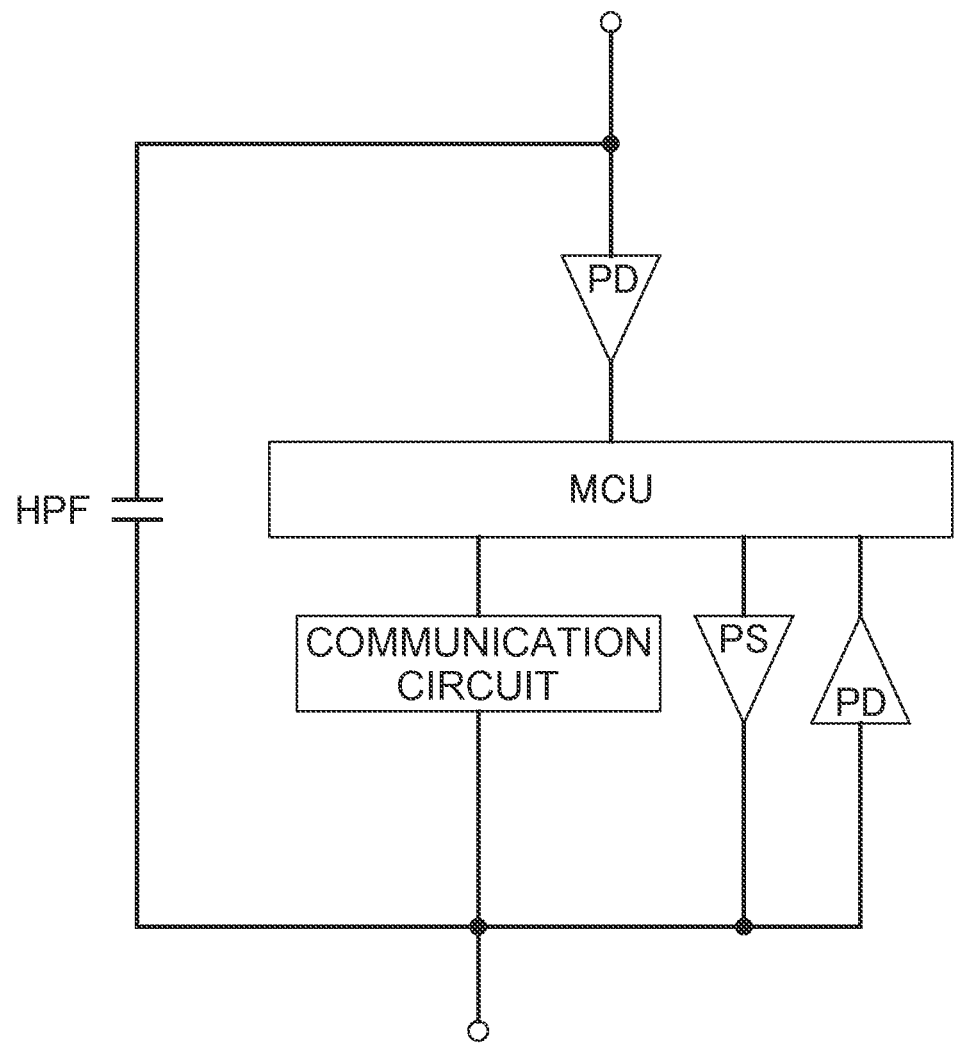
FIG. 6B is a circuit block diagram of a low-frequency-signal superimposing scheme of a refrigerant-circuit-switching unit in FIG. 5A.

Further, in a case of a device, such as the refrigerant-circuit-switching units 403A and 403B described in FIG. 5A, that needs to recognize an indoor unit connected to the downstream-side port, the upstream-side port is only for receiving low-frequency communication and thus includes only a low-frequency-signal-receiving circuit PD, as shown in FIG. 6B. Further, the downstream-side port includes a communication circuit, a low-frequency-signal-transmitting circuit PS, and a low-frequency-signal-receiving circuit PD. Further, a high-frequency-passing filter HPF, which blocks propagation of a low-frequency signal and passes a high-frequency signal, is provided between the upstream-side port and the downstream-side port.

Figure 6C:
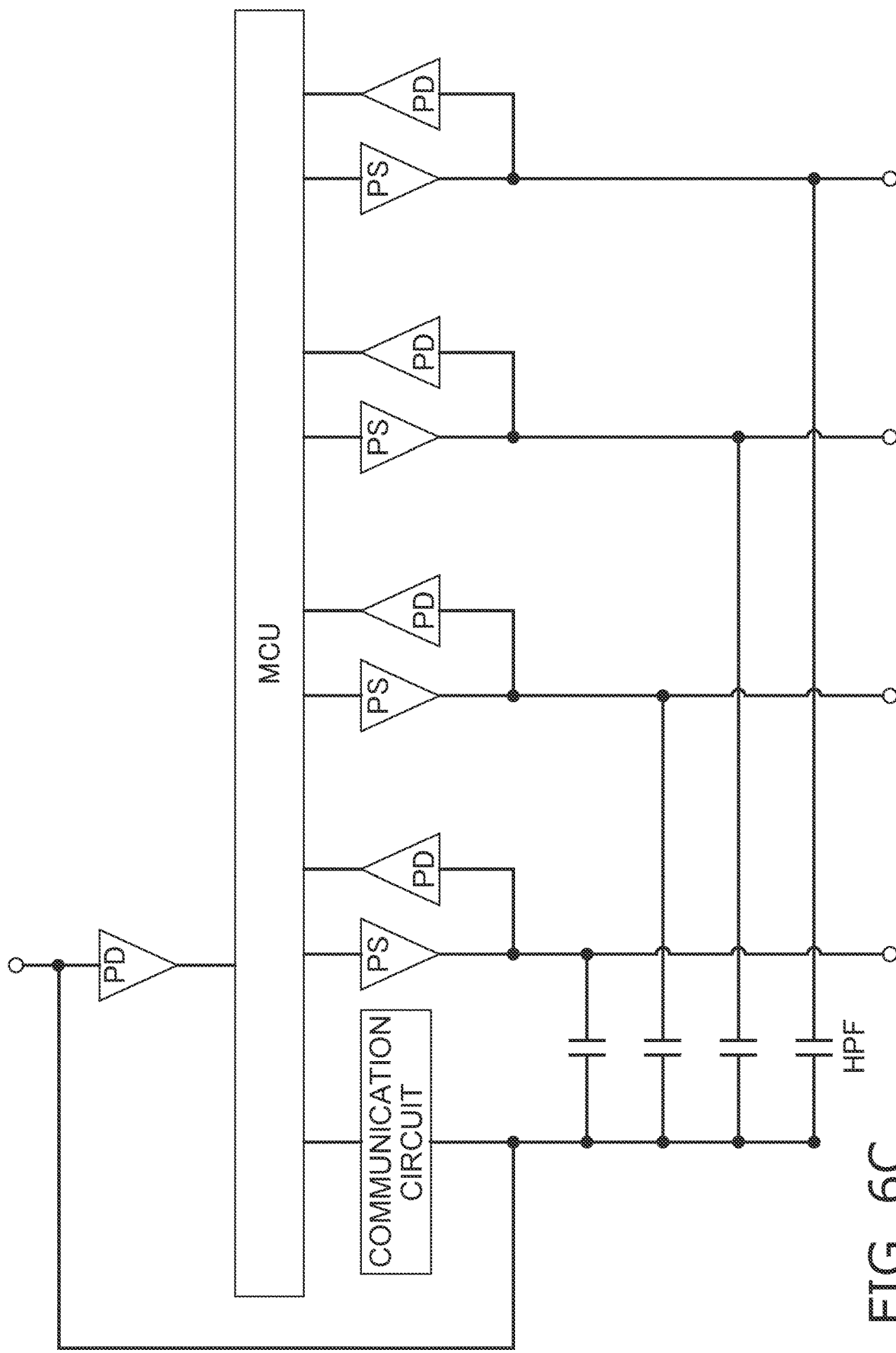
FIG. 6C is a circuit block diagram of a low-frequency-signal superimposing scheme of an integrated-refrigerant-circuit-switching unit in FIG. 5B.

Further, in a case of a device, such as the integrated-refrigerant-circuit-switching unit 423 described in FIG. 5B, that needs to recognize which indoor unit is connected to each of a plurality of downstream-side ports, the upstream-side port is only for receiving low-frequency communication and thus includes only a low-frequency-signal-receiving circuit PD, as shown in FIG. 6C. Each of the plurality of downstream-side ports includes a low-frequency-signal-transmitting circuit PS and a low-frequency-signal-receiving circuit PD. Further, a high-frequency-passing filter HPF, which blocks propagation of a low-frequency signal and passes a high-frequency signal, is provided between the upstream-side port and each of the downstream-side ports.

Figure 7:
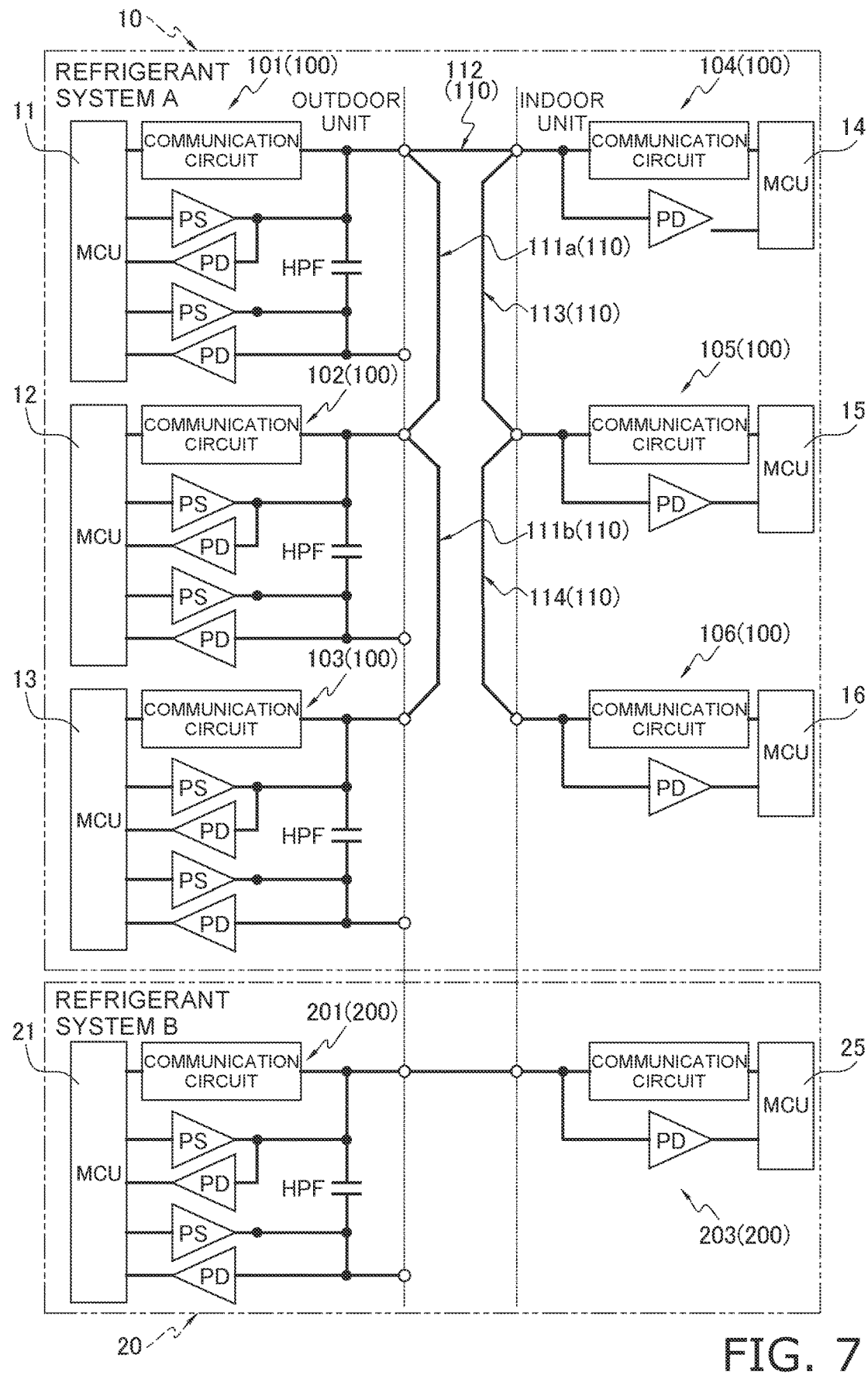
FIG. 7 is a circuit block diagram of the air-conditioning system shown in FIG. 4A.

FIG. 7 is a circuit block diagram of the air-conditioning system shown in FIG. 4A. For convenience, the refrigerant system A and part of the refrigerant system B are shown. In FIG. 7, a high-frequency-passing filter HPF, which blocks the propagation of a low-frequency signal and passes a high-frequency signal, is provided between two downstream-side ports of each outdoor unit.

(7) Processing in a Case where Presence of Device Outside System is Confirmed During System Recognition Here, a processing method in a case where capacitive or inductive coupling occurs between systems and the presence of a device outside the system is confirmed during the system recognition will be described. For convenience, the description will be given supposing that a network is formed for each of two refrigerant systems.

Figure 8A:
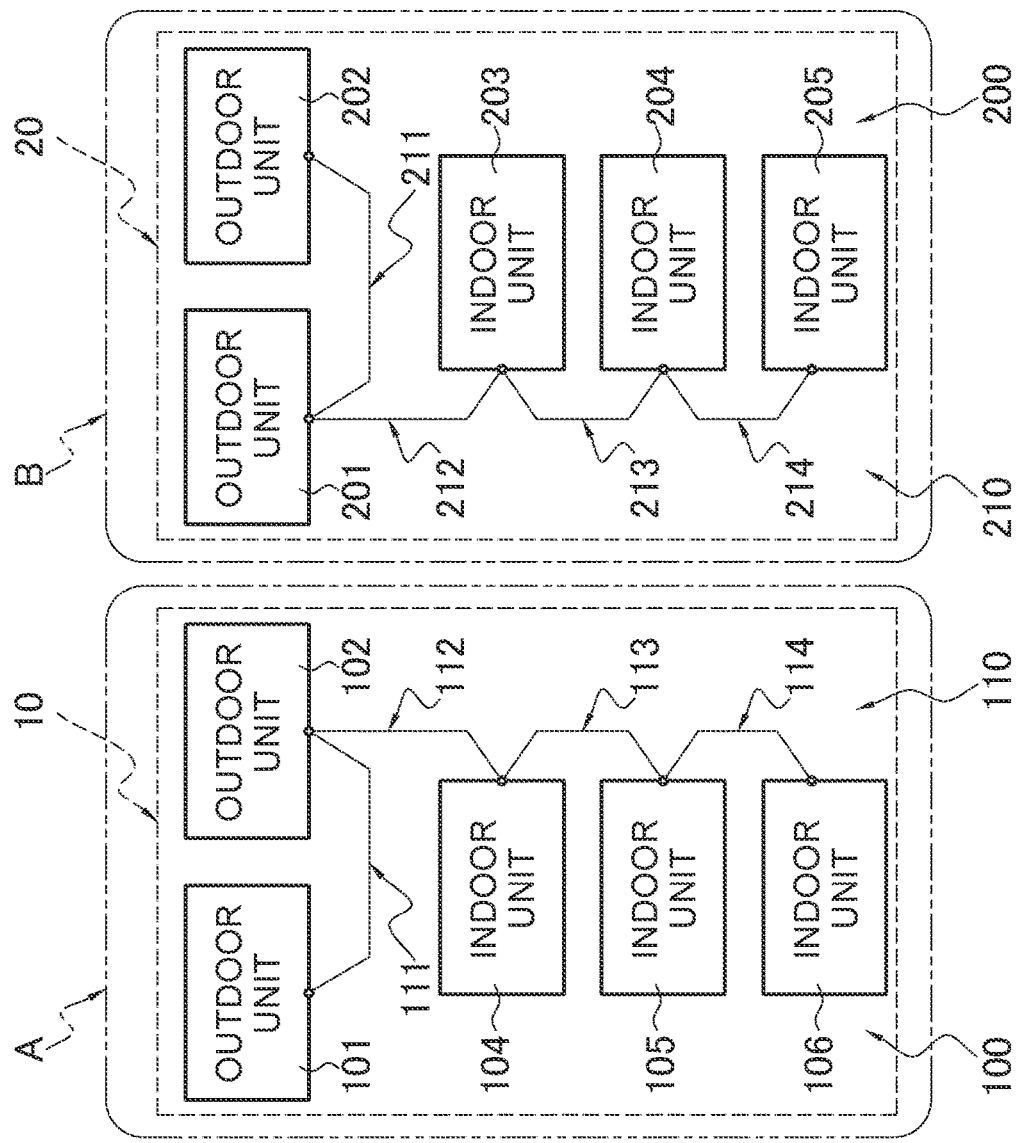
FIG. 8A is a configuration diagram of a state in which networks between devices are normally formed in an air-conditioning system including two refrigerant systems.

FIG. 8A is a configuration diagram of a state in which networks between devices are normally formed in an air-conditioning system including two refrigerant systems.

In FIG. 8A, in a refrigerant system A, outdoor units 101 and 102 and indoor units 104, 105, and 106, which are devices belonging to a first device group 100, are connected by wired lines 111, 112, 113, and 114 belonging to a first wired-line group 110. A first network 10 is formed between the devices connected by the first wired-line group 110.

In a refrigerant system B, outdoor units 201 and 202 and indoor units 203, 204, and 205, which are devices belonging to a second device group 200, are connected by wired lines 211, 212, 213, and 214 belonging to a second wired-line group 210. A second network 20 is formed between the devices connected by these wired line groups.

(7-1) First State in which Crosstalk Occurs

Figure 8B:
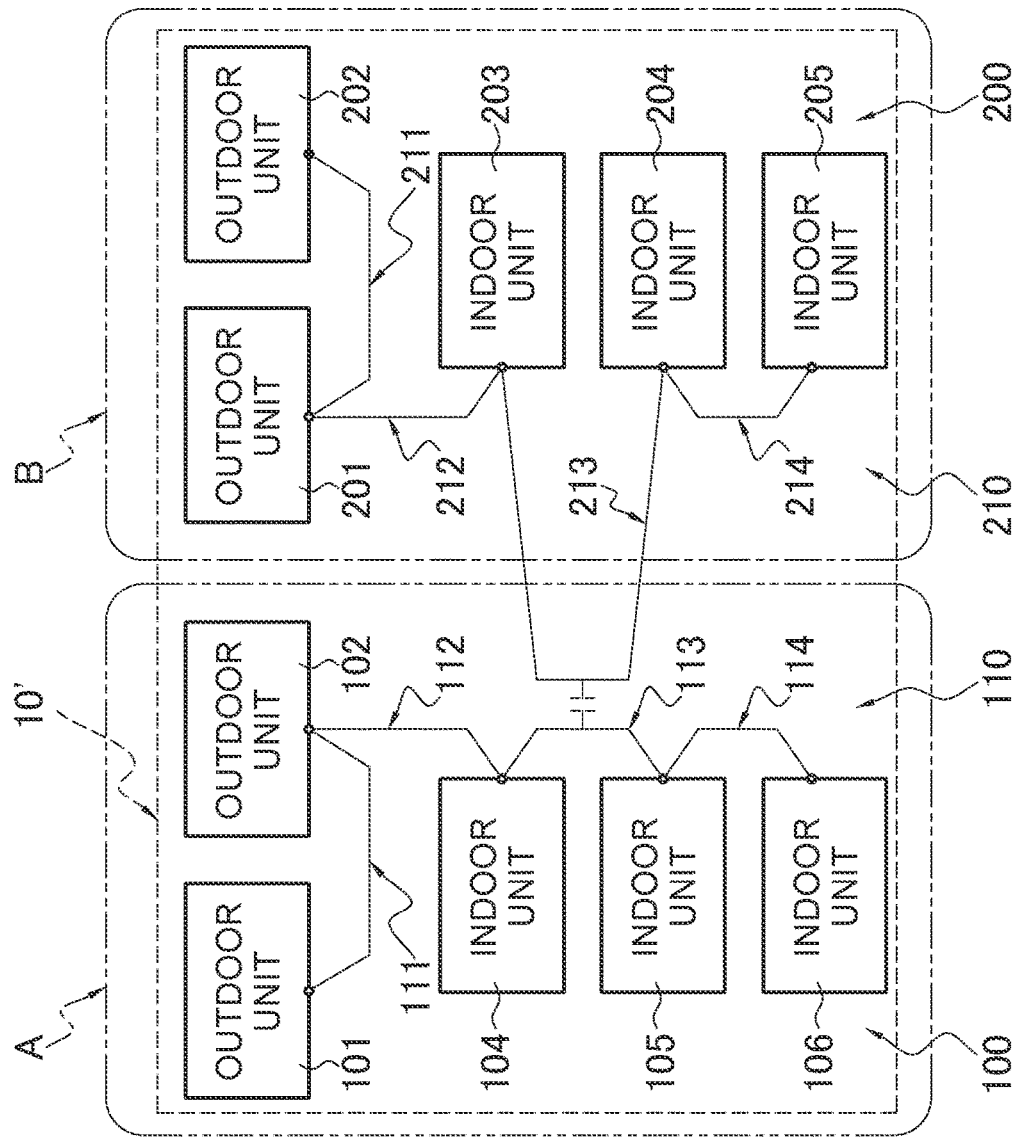
FIG. 8B is a configuration diagram of a state in which the two networks of FIG. 8A are coupled and one network is formed.

FIG. 8B is a configuration diagram of a state in which the two networks of FIG. 8A are coupled and one network is formed.

In FIG. 8B, capacitive or inductive coupling occurs since the wired lines are adjacent to each other between the refrigerant system A and the refrigerant system B, and a communication signal propagates to the network of the other system due to the crosstalk. As a result, the second network 20 is coupled to the first network 10, and one first network 10' is formed.

In such a state, the devices of the refrigerant system A can also communicate with the devices of the refrigerant system B. Since an ability to set which system to which the devices belong or detect which system to which the devices belong with a detection means is equivalent to joining by an inter-system-connection wired line, there is no problem in terms of the control of the air-conditioning devices. However, since weak crosstalk coupling makes the attenuation of the signal large, the communication quality decreases at the coupling portion due to the crosstalk, and thus the processing capacity per unit time of the entire network decreases.

(7-2) Second State in which Crosstalk Occurs

Figure 8C:
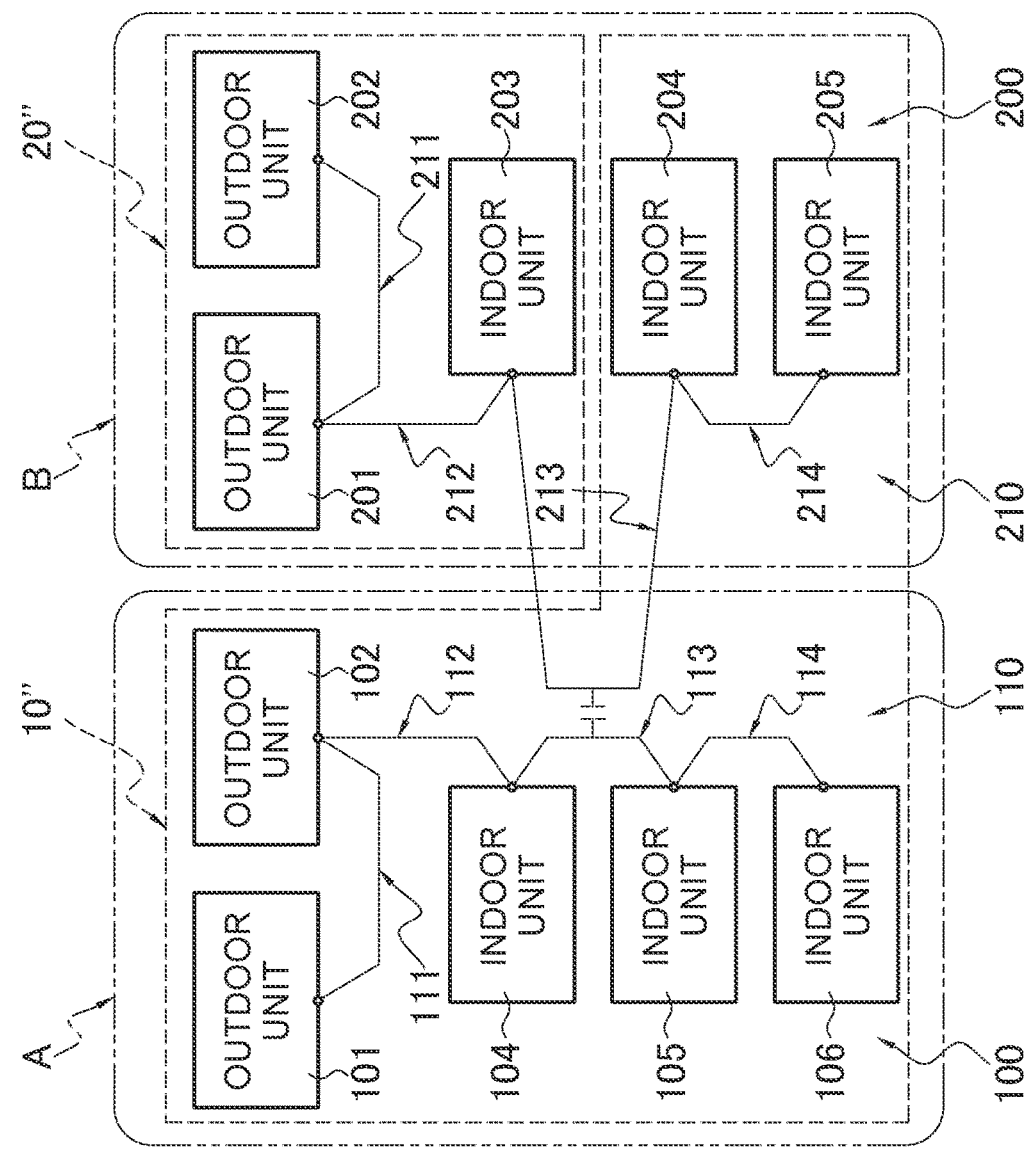
FIG. 8C is a configuration diagram of a state in which some devices of FIG. 8A are coupled to the other network, and two networks having configurations different from the original configurations are formed.

FIG. 8C is a configuration diagram of a state in which some devices of FIG. 8A are coupled to the other network, and two networks having configurations different from the original configurations are formed.

In FIG. 8C, capacitive or inductive coupling occurs since the wired lines are adjacent to each other between the refrigerant system A and the refrigerant system B, and a communication signal propagates to the network of the other system due to the crosstalk. As a result, some devices (the indoor units 204 and 205) on the second network 20 are coupled to the first network 10, and two virtual first network 10" and virtual second network 20" are formed in configurations different from the initial connection configurations of the refrigerant systems.

Such a network is formed in a case where a master/slave protocol is employed for communication. Such a network may occur since a plurality of masters competes with each other for acquiring slaves due to the restriction that only one master exists on one network.

In such a case, communication between the outdoor units 201 and 202 and the indoor units 204 and 205 in the refrigerant system B is impossible, and the control cannot be performed.

(7-3) Network Coupling Elimination

In order to eliminate the coupling of the networks as described above due to the crosstalk, it is necessary to determine a mismatch state between the network and the refrigerant system, disconnect the device in the mismatch state from the network to which the device belongs, and search for the other network and connect the device to the other network.

As the means, conceivable are two types of methods: a method for setting which system to which the devices belong, and a method for detecting the mismatch state with a detection means.

(7-3-1) Method for Detecting Mismatch State

In the system recognition, a low-frequency signal of a low frequency is transmitted to devices in the same system, and devices that have received the low-frequency signal respond by high-frequency communication. Therefore, the system recognition is performed after the communication is established.

Each of the outdoor units and the indoor units includes a high-frequency communication circuit, and establishes communication after the power-on. The device participating in the network can acquire a unique ID or a communication address through the communication.

When the system recognition is completed, a list of the devices whose system has been recognized is obtained. A device which exists on the communication network but is not recognized by the system recognition and does not exist on the list disconnects from the communication network or is disconnected from the communication network.

For example, even if in FIG. 8C, a state occurs in which it is recognized that the indoor units 204 and 205 of the refrigerant system B are in the network of the refrigerant system A due to capacitive or inductive coupling, system recognition is performed and the completion of the system recognition is notified to the entire network, and thus at that time, the indoor units 204 and 205 recognize that the indoor units 204 and 205 have not been recognized, and the indoor units 204 and 205 disconnect.

(7-3-2) Method for Setting which System to which Devices Belong

Even if crosstalk does not occur during network construction, crosstalk may occur due to subsequent movement of the wired line or the like. For example, in a case where the wired lines are brought together and then crosstalk occurs, the network is reconstructed.

In such a case, since a same-system list has been created by the latest system recognition, a device which is not registered in the list may be disconnected after system recognition is performed again.

(8) Features (8-1)

In the device network system, system recognition processing is performed using a low-frequency signal including a network ID for connection to the network and a group ID. Therefore, a device of another network not physically joined is prevented from being recognized as the same system (hereinafter, referred to as crosstalk). Further, even in a case where there is a plurality of networks that is targets of the system recognition, the system recognition processing can be simultaneously performed, and the time taken by the system recognition processing is shortened. As a result, it is possible to both prevent crosstalk and shorten the system recognition processing time.

(8-2)

In the device network system, a device connected to a network uses high-frequency communication to request an approval for participation in the network.

(8-3)

In the device network system, predetermined instruction information is transmitted together with an approval for participation in the network and a network ID. The predetermined instruction information is specifically an instruction to "transmit a network ID to downstream devices" and an instruction on the "network ID to be transmitted by a low-frequency signal".

(8-4)

In the device network system, the predetermined instruction information, an approval for participation in the network, and a network ID are aggregated into one message, and the one message is transmitted. The aggregation of the messages can reduce the total number of messages on the communication line, and can reduce the traffic. Further, the aggregation of the messages into one message can simplify the structure of the control unit (MCU).

(8-5)

In the device network system, a device which has received the predetermined instruction information uses a low-frequency signal to transmit a network ID received by high-frequency communication to devices downstream of the device. Since only a master unit transmits the predetermined instruction information by high-frequency communication, the master unit can manage the number of devices participating in the network and the scale of the network. Further, a method is also used in which in a case where the number of stages of the connected devices is deeper than the expected number, it is determined that there is an abnormality, and the predetermined instruction information is not sent. In addition, the terminals are prevented from sending downstream, without permission, a network ID (the MAC address of the master) received by low-frequency communication (in order to avoid a situation that cannot be controlled).

(8-6)

The device network system includes the first network 10, the second network 20, and an MCU 11 of the outdoor unit 101 that performs system recognition processing of the first device group of the first network 10. The MCU 11 of the outdoor unit 101 performs recognition processing for recognizing the outdoor units 102 and 103 and the indoor units 104, 105, and 106 of the first network 10. In the first network 10, high-frequency signals are used in communication between the outdoor units 101, 102, and 103 and the indoor units 104, 105, and 106, and low-frequency signals including a network ID for connection to the first network 10 and a group ID to which the first device group belongs are used in the system recognition processing performed by the MCU 11. Therefore, in the system recognition processing of the first device group of the first network 10, second devices of the second network 20 not physically joined are avoided being recognized.

(8-7)

The device network system further includes an MCU 21 of the outdoor unit 201 for performing system recognition processing of a second device group of the second network 20. The MCU 21 performs recognition processing for recognizing the outdoor unit 202 and the indoor units 203, 204, and 205 of the second network 20.

(8-8)

In the device network system, in the second network 20, high-frequency signals are used in communication between the outdoor units 201 and 202 and the indoor units 203, 204, and 205, and low-frequency signals including a network ID for connection to the second network 20 and a group ID to which the second device group belongs are used in the system recognition processing performed by the MCU 21 of the outdoor unit 201. Therefore, in the system recognition processing of the second device group of the second network 20, first devices of the first network 10 not physically joined are avoided being recognized.

(8-9)

In the device network system, at least one of the network ID of the first network the network ID of the second network 20, and a group ID is given to a low-frequency signal by modulating the low-frequency signal.

(8-10)

In the first network 10, after the communication is established by high-frequency communication, the MCU 11 of the outdoor unit 101 performs the system recognition processing.

(8-11)

Since a system-recognizing device performs the system recognition processing using a low-frequency signal including a network ID for connection to the network, and a group ID, a device of another network not physically joined is prevented from being recognized as the same system (hereinafter, referred to as crosstalk). Further, even in a case where there is a plurality of networks that is targets of the system recognition, the system recognition processing can be simultaneously performed, and the time taken by the system recognition processing is shortened. As a result, it is possible to both prevent crosstalk and shorten the system recognition processing time.

(8-12)

In a case where a first group and a second group form a network, the system-recognizing device is connected to both the first group and the second group.

For example, the refrigerant-circuit-switching unit 403A is connected to both the system D (first group) on the upstream side and the system E (second group) on the downstream side. The refrigerant-circuit-switching unit 403B is connected to both the system D (first group) on the upstream side and the system F (third group) on the downstream side.

A low-frequency signal from the outdoor unit 401A, which is the master unit, propagates only to the outdoor unit 401B, the indoor unit 402, and the refrigerant-circuit-switching units 403A and 403B of the system D, which is the same system, and the low-frequency signal does not propagate to the indoor units 404, 405, and 406 of the system E and the indoor units 407, 408, and 409 of the system F, which are different systems.

(8-13)

In a case where a first group, a second group, and a third group form a network, the system-recognizing device is connected to the first group, the second group, and the third group.

For example, the integrated-refrigerant-circuit-switching unit 423 is connected to the system G (first group) on the upstream side and the systems H, I, J, and K (second to fifth groups) on the downstream side.

A low-frequency signal from the outdoor unit 421A, which is the master unit, propagates only to the outdoor unit 421B, the indoor unit 422, and the integrated-refrigerant-circuit-switching unit 423 of the system G, which is the same system, and the low-frequency signal does not propagate to the indoor units 424, 425, 426, and 427 of the systems H to K, which are different systems. Further, a low-frequency signal from the integrated-refrigerant-circuit-switching unit 423 does not propagate to the outdoor unit 421A, the outdoor unit 421B, and the indoor unit 422 of the system G.

The integrated-refrigerant-circuit-switching unit 423 can perform system recognition processing by sending a low-frequency signal to the indoor units 424, 425, 426, and 427 of the systems H to K belonging to the integrated-refrigerant-circuit-switching unit 423. Therefore, the time taken by the system recognition processing is shortened.

(9) Modifications (9-1)

In the device network system according to the above-described embodiment, a device that has received the network ID and the group ID uses high-frequency communication to request the participation in the network. In addition, a device for which participation in the network has been approved may use the high-frequency communication to request participation in the group.

(9-2)

Another possible interpretation is that in the first network 10, the MCU 11 (first processing unit) of the outdoor unit 101 performs the system recognition processing and then establishes communication by high-frequency communication.

Although the embodiment of the present disclosure has been described above, it will be understood that various changes in the forms and details can be made without departing from the spirit and scope of the present disclosure as set forth in the claims.

The invention claimed is:

1. A device network system, wherein
   system recognition processing that identifies a device connected by a wired line is performed using a low-frequency signal of a frequency lower than a first frequency used in communication,
   a signal of the first frequency is used to transmit predetermined instruction information,
   the low-frequency signal includes first information for connection to a network, and
identification information of a group to which a device to which the low-frequency signal is transmitted belongs, and
the predetermined instruction information is transmitted to a device that
has received the low-frequency signal,
has registered the first information, and
has connected to the network, and
for which participation in the network has been approved.

2. The device network system according to claim 1, wherein
the device that has connected to the network uses a signal of the first frequency to request an approval for participation in the network.

3. The device network system according to claim 2, wherein
the predetermined instruction information is transmitted together with
an approval for participation in the network, and
the first information.

4. The device network system according to claim 3, wherein
the predetermined instruction information, the approval for participation in the network, and the first information are aggregated into one message, and
the one message is transmitted.

5. The device network system according to claim 1, wherein
the device for which participation in the network has been approved uses a signal of the first frequency to request participation in the group.

6. The device network system according to claim 1, wherein
the predetermined instruction information is information that instructs that the first information be transmitted using the low-frequency signal.

7. The device network system according to claim 6, wherein
the device that has received the predetermined instruction information uses the low-frequency signal to transmit the first information received by a signal of the first frequency, to a device downstream of the device that has received the predetermined instruction information.

8. The device network system according to claim 1, comprising:
as the network, a first network including a first device group including a plurality of first devices, and a first wired-line group connected to the plurality of first devices;
a second network including a second device group including a plurality of second devices not physically joined to the first network, and a second wired-line group connected to the plurality of second devices; and
a first processing unit that performs the system recognition processing of the first device group of the first network,
in the first network,
a high-frequency signal of the first frequency being used in communication between the first devices, and
a low-frequency signal including the first information for connection to the first network and identification information of a group to which the first device group belongs being used in the system recognition processing performed by the first processing unit.

9. The device network system according to claim 8, further comprising:
a second processing unit that performs the system recognition processing of the second device group of the second network.

10. The device network system according to claim 9, wherein
in the second network,
a high-frequency signal of the first frequency is used in communication between the second devices, and
a low-frequency signal including second information for connection to the second network and identification information of a group to which the second device group belongs is used in the system recognition processing performed by the second processing unit.

11. The device network system according to claim 10, wherein
at least one of the first information, the second information, and the identification information is given to a low-frequency signal by modulating the low-frequency signal.

12. The device network system according to claim 8, wherein
in the first network, after communication is established by high-frequency communication, the first processing unit performs the system recognition processing.

13. The device network system according to claim 8, wherein
in the first network, after the first processing unit performs the system recognition processing, communication is established by high-frequency communication.

14. A system-recognizing device that, in a device network in which communication is established between a plurality of devices, uses a low-frequency signal of a frequency lower than a first frequency used in the communication to perform system recognition processing that identifies a device connected by a wired line, wherein
a signal of the first frequency is used to transmit predetermined instruction information,
the low-frequency signal includes
first information for connection to a network, and
identification information of a group to which a device to which the low-frequency signal is transmitted belongs, and
the predetermined instruction information is transmitted to a device that
has received the low-frequency signal,
has registered the first information, and
has connected to the network, and
for which participation in the network has been approved.

15. The system-recognizing device according to claim 14, wherein
the system-recognizing device is connected to both a first group and a second group,
the first group including a first device group including a plurality of first devices, and a first wired-line group connected to the plurality of first devices, and
the second group including a second device group including a plurality of second devices, and a second wired-line group connected to the plurality of second devices form the network.

16. The system-recognizing device according to claim 14, wherein
the system-recognizing device is connected to a first group, a second group, and a third group the first group including a first device group including a plurality of first devices, and a first wired-line group connected to the plurality of first devices, the second group including a second device group including a plurality of second devices, and a second wired line connected to the plurality of second devices, and the third group including a third device group including a plurality of third devices, and a third wired line connected to the plurality of third devices form the network.

* * * * *